United States Patent
Takahashi

[11] Patent Number: 6,130,784
[45] Date of Patent: Oct. 10, 2000

[54] RESOLUTION ENHANCING IMAGE DISPLAY APPARATUS

[75] Inventor: Koichi Takahashi, Hachioji, Japan

[73] Assignee: Olympus Optical Co., Ltd., Tokyo, Japan

[21] Appl. No.: 09/207,579

[22] Filed: Dec. 8, 1998

[30] Foreign Application Priority Data

Dec. 17, 1997 [JP] Japan ................................ 9-347850

[51] Int. Cl.[7] .................................................. G02B 27/14
[52] U.S. Cl. ........................... 359/630; 359/631; 359/633
[58] Field of Search ................................. 359/630, 631, 359/633, 636, 637, 639; 345/7, 8

[56] References Cited

U.S. PATENT DOCUMENTS

| | | | |
|---|---|---|---|
| 5,546,227 | 8/1996 | Yasugaki et al. | 359/630 |
| 5,908,300 | 6/1999 | Walker et al. | 434/43 |
| 6,008,778 | 12/1999 | Takahashi et al. | 345/7 |
| 6,054,969 | 4/2000 | Haisma | 345/7 |

*Primary Examiner*—Ricky Mack
*Attorney, Agent, or Firm*—Pillsbury Madison & Sutro LLP

[57] ABSTRACT

An image display apparatus that presents an observer an image of higher resolution than the original resolution of an image display device used, thereby allowing the observer to view a clear and beautiful image. An illuminating optical system (5) illuminates an image display device with illuminating light from a light source (1). The image display device displays an image by transmission or reflection of the illuminating light. A viewing optical system leads the image to an observer's eyeball (10). The apparatus has two image display devices (9a and 9b). An optical coupling/separating element having a light-coupling or light-separating action is provided between the image display devices (9a and 9b) and the observer's eyeball (10) to superimpose images of the two image display devices on one another. The optical coupling/separating element has an optical coupling/separating surface (40) tilted at an angle of approximately 45 degrees with respect to each of the image display devices (9a and 9b). The viewing optical system projects the superimposed images into one eyeball (10) of the observer as an enlarged virtual image.

29 Claims, 20 Drawing Sheets

FIG.16(a)

| R | G | B | R | G | B | R |
|---|---|---|---|---|---|---|
| R | G | B | R | G | B | R |
| R | G | B | R | G | B | R |

Image display device
for chrominance signal

FIG.16(b)

Image display device
for luminance signal

RESOLUTION ENHANCING IMAGE DISPLAY APPARATUS

BACKGROUND OF THE INVENTION

1. Field of the Invention

The present invention relates to an image display apparatus and, more particularly, to a compact and lightweight image display apparatus capable of being mounted on an observer's head.

2. Discussion of Related Art

As a conventional image display apparatus, Japanese Patent Application Unexamined Publication (KOKAI) No. 6-250113, filed by the present applicant, is known. FIG. 28 in the accompanying drawings shows the entire optical system of the known image display apparatus. As illustrated in the figure, light emanating from a two-dimensional display device is led to an observer's eyeball placed at the pupil position by an ocular optical system including a beam splitter prism and a concave mirror, thereby presenting an enlarged virtual image to the observer. General head-mounted image display apparatuses adopt this arrangement.

Incidentally, there have been observers' demands that image display apparatuses using a liquid crystal display device as an image display device should present an even more beautiful and brighter image for observation. That is, it is demanded that the resolution of the image field for observation should be high. In other words, it is necessary to use an image display device having a high pixel density. However, an image display device having a high pixel density is costly. Moreover, there is a limit to the pixel density due to restrictions on manufacturing. Therefore, it has heretofore been difficult to provide an image of high resolution at low cost with an image display apparatus of the type in which an image displayed by a small image display device is projected into an observer's eyeball as an enlarged virtual image, as stated above.

SUMMARY OF THE INVENTION

In view of the above-described problems with the prior art, an object of the present invention is to provide an image display apparatus that presents an observer an image of higher resolution than the original resolution of an image display device used, despite a relatively low-cost arrangement, thereby allowing the observer to view a clear and beautiful image.

To attain the above-described object, the present invention provides an image display apparatus of the type which includes a light source that emits illuminating light, and an illuminating optical system that illuminates an image display device with the illuminating light. The image display device displays an image by transmission or reflection of the illuminating light. The image display apparatus further includes a viewing optical system that leads the image to an observer's eyeball. The image display apparatus according to the present invention has two image display devices. An optical coupling/separating element having a light-coupling or light-separating action is provided between the two image display devices on the one hand and the observer's eyeball on the other. The optical coupling/separating element superimposes images of the two image display devices on one another. The optical coupling/separating element has an optical coupling/separating surface tilted at an angle of approximately 45 degrees with respect to each of the two image display devices. The viewing optical system projects the superimposed images into one eyeball of the observer as an enlarged virtual image.

In addition, the present invention provides an image display apparatus of the type which includes a light source that emits illuminating light, and an illuminating optical system that illuminates an image display device with the illuminating light. The image display device displays an image by transmission or reflection of the illuminating light. The image display apparatus further includes a viewing optical system that leads the image to an observer's eyeball. The image display apparatus according to the present invention has two image display devices. An optical coupling/separating element having a light-coupling or light-separating action is provided between the two image display devices on the one hand and the observer's eyeball on the other. The optical coupling/separating element superimposes images of the two image display devices on one another and directs the superimposed images in two directions. The optical coupling/separating element has an optical coupling/separating surface tilted at an angle of approximately 45 degrees with respect to each of the two image display devices. The image display apparatus has two viewing optical systems to project the superimposed images into the observer's left and right eyes, respectively, as enlarged virtual images.

In addition, the present invention provides an image display apparatus of the type which includes a light source that emits illuminating light, and an illuminating optical system that illuminates an image display device with the illuminating light. The image display device displays an image by transmission or reflection of the illuminating light. The image display apparatus further includes a viewing optical system that leads the image to an observer's eyeball. The image display apparatus according to the present invention has two image display devices, i.e. a first image display device and a second image display device. An optical coupling/separating element having a light-coupling or light-separating action is provided between the two image display devices on the one hand and the observer's eyeball on the other. The optical coupling/separating element superimposes images of the two image display devices on one another. The optical coupling/separating element has an optical coupling/separating surface tilted at an angle of approximately 45 degrees with respect to each of the two image display devices. The viewing optical system projects the superimposed images into the observer's eyeball as an enlarged virtual image. The first and second image display devices are disposed so that the pixel array of the first image display device and the pixel array of the second image display device are superimposed with a displacement therebetween. An optical low-pass filter is placed in the optical path of the viewing optical system to separate light emanating from the first and second image display devices into a plurality of light beams in a direction approximately perpendicular to the direction of the displacement between the pixel arrays, thereby forming a smooth image.

In addition, the present invention provides an image display apparatus of the type which includes a light source that emits illuminating light, and an illuminating optical system that illuminates an image display device with the illuminating light. The image display device displays an image by transmission or reflection of the illuminating light. The image display apparatus further includes a viewing optical system that leads the image to an observer's eyeball. The image display apparatus according to the present invention has two image display devices. An optical coupling/separating element having a light-coupling or light-separating action is provided between the two image display devices on the one hand and the observer's eyeball on the other. The optical coupling/separating element superimposes images of the two image display devices on one another. The optical coupling/separating element has an optical coupling/separating surface tilted at an angle of approximately 45 degrees with respect to each of the two image display devices. The viewing optical system projects the superimposed images into the observer's eyeball as an enlarged virtual image. One of the two image display devices displays monochromatic image information carried by a luminance signal in an externally input picture signal. The other of the two image display devices displays image information carried by a chrominance signal in the picture signal.

The reasons for adopting the above-described arrangements in the present invention, together with the functions thereof, will be described below.

A typical image display apparatus according to the present invention is shown in FIG. 1 by way of example. In FIG. 1, two illuminating optical systems 5a and 5b are placed with respect to a single light source 1 that emits illuminating light. The display surfaces of transmissive liquid crystal display devices 9a and 9b, which are image display devices, are illuminated from the rear through the illuminating optical systems 5a and 5b. In this example, an optical coupling/separating element and a viewing optical system are implemented with a single optical element. Therefore, this optical element will be hereinafter referred to as a "composite optical system 3". Surfaces of the composite optical system 3 through which light from the image display devices 9a and 9b enter it are denoted by reference numerals 31a and 31b, respectively. A surface of the composite optical system 3 through which light exits toward an observer is denoted by reference numeral 32.

Images produced by the image display devices 9a and 9b can be combined together by an optical coupling/separating surface 40 in the composite optical system 3. It is possible to display an image of high resolution by displacing the pixels of the two image display devices 9a and 9b relative to each other, for example. The entrance surfaces 31a and 31b and the exit surface 32 are refracting surfaces having a positive power. Consequently, the superimposed images of the image display devices 9a and 9b can be led to an observer's eyeball 10 by the composite optical system 3 and observed as an enlarged virtual image.

The transmissive liquid crystal display devices 9a and 9b are twisted nematic liquid crystal display devices (TN liquid crystal display devices). In this case, the twist angle is set at 90 degrees. Light enters each liquid crystal display device as linearly polarized light through a polarizing plate (not shown) placed on the rear side (illuminating side) of the liquid crystal display surface. The light is changed into a certain state of polarization (usually, elliptically polarized light) by passing through pixels of the liquid crystal display device to which a voltage is being applied. Then, the light exits from the liquid crystal display device through a display surface-side polarizing plate (not shown) having a transmitting action in a direction perpendicular to that of the first-mentioned polarizing plate. Therefore, the direction of polarization of the emergent light has been rotated through 90 degrees from that of the incident light. The directions of polarization of light emanating from the two image display devices 9a and 9b are set perpendicular to each other.

Accordingly, the optical coupling/separating surface 40 in the composite optical system 3 is arranged in the form of a polarizing half-mirror surface so that the polarizing half-mirror surface 40 reflects S wave and transmits P wave. The polarizing half-mirror surface 40 is tilted at an angle of approximately 45 degrees with respect to each of the image display devices 9a and 9b. Let us assume that the image display device 9a emits S wave, whereas the image display device 9b emits P wave. When light from the image display device 9a is incident on the polarizing half-mirror surface 40, approximately all of the incident light is reflected by the polarizing half-mirror surface 40. When light from the image display device 9b is incident on the polarizing half-mirror surface 40, approximately all of the incident light, which is P wave, passes through the polarizing half-mirror surface 40. Accordingly, light from each of the two image display devices 9a and 9b can be led to the observer's eyeball 10 with a minimal loss of the light quantity. Thus, it is possible to observe a remarkably bright image.

The composite optical system 3 is arranged in a rectangular prism configuration in which the polarizing half-mirror surface 40, which is an optical coupling/separating surface, is placed in an optical plastic material that is a transparent optical medium having a refractive index of approximately 1.5. Entrance surfaces 31a and 32b through which light from the image display devices 9a and 9b enters the prism each have a positive power. An exit surface 32 on the observer side also has a positive power. Consequently, the combined images of the two image display devices 9a and 9b can be observed as an enlarged virtual image with only the composite optical system 3. Ray paths along which light from the two image display devices 9a and 9b are led to the observer's eyeball 10, form optical systems that can be regarded as coaxial refracting systems, although there is a difference in the action exerted on the light at the polarizing half-mirror surface 40, i.e. the light from the image display device 9a is reflected by the polarizing half-mirror surface 40, whereas the light from the image display device 9b passes through the polarizing half-mirror surface 40. The focal lengths of the two refracting systems are made equal to each other by giving the same power to the entrance surfaces 31b and 32b of the composite optical system 3. Consequently, both the images of the two image display devices 9a and 9b are formed on the retina of the observer's eyeball 10. Accordingly, the whole apparatus is remarkably compact and lightweight. Thus, it is possible to realize an image display apparatus of high resolution at reduced cost.

FIG. 2 shows a second example of the image display apparatus according to the present invention. In FIG. 2, the image display apparatus has two reflective liquid crystal display devices 9a and 9b as image display devices. A composite optical system 3' is arranged in a rectangular prism configuration in which a polarizing half-mirror surface 40, which is an optical coupling/separating surface, is placed in an optical plastic material that is a transparent optical medium having a refractive index of approximately 1.5. An entrance surface 33 through which light from a light source 1 enters the prism has a positive power. Entrance surfaces 31a and 31b through which light from the image display devices 9a and 9b enters the prism each have a positive power. An exit surface 32 on the observer side also has a positive power. This optical system will be hereinafter referred to as a "composite optical system 3'".

With the above-described arrangement, the composite optical system 3' has an optical coupling/separating action whereby images of the two image display devices 9a and 9b are combined together, and also has the action of a viewing optical system whereby the combined images of the image display devices 9a and 9b are projected into the observer's eyeball 10 as in the case of the arrangement shown in FIG. 1. In addition, the composite optical system 3' has the action of an illuminating optical system whereby light from the light source 1 is separated into P wave and S wave, and the P and S waves are led to the respective surfaces of the two image display devices 9a and 9b. The optical coupling/separating surface 40 of the composite optical system 3' also assumes the roles of analyzers and polarizers for the image display devices 9a and 9b. By virtue of this arrangement, the reduction in the light quantity due to a polarizing plate becomes smaller than in the case of an ordinary liquid crystal display device, and a polarizing plate itself becomes unnecessary. In other words, it is possible to realize a bright image at reduced cost.

Furthermore, the positive power of the illumination-side entrance surface 33 makes it possible to expect the advantageous effect that light emitted from the light source 1 is condensed and taken into the optical system 3' as much as possible.

In addition, the positive powers of the entrance surfaces 31a and 31b for the image display devices 9a and 9b and the observer-side exit surface 32 enable light emanating from the image display devices 9a and 9b to be formed into approximately parallel beams and projected into the observer's eyeball 10. Therefore, the observer can view the combined images of the image display devices 9a and 9b as an enlarged virtual image.

A typical image display apparatus according to a second aspect of the present invention is shown in FIG. 4 by way of example. In FIG. 4, light emitted from a light source 1 is passed through illuminating optical systems 5a and 5b to illuminate the display surfaces of transmissive liquid crystal display devices 9a and 9b from the rear. The liquid crystal display devices 9a and 9b are, for example, TN liquid crystal display devices. In this case, the twist angle is not necessarily limited to a particular angle. A non-polarizing beam splitter 4 has a non-polarizing half-mirror surface 40' that transmits a part of incident light from the image display devices 9a and 9b and reflects a part of the incident light. The non-polarizing beam splitter 4 enables images of the image display devices 9a and 9b to be superimposed on one another.

A part of light from the image display device 9a that is reflected by the non-polarizing beam splitter 4 is superimposed on a part of light from the image display device 9b that is transmitted by the non-polarizing beam splitter 4 to form a light beam 13R. On the other hand, a part of light from the image display device 9a that is transmitted by the non-polarizing beam splitter 4 is superimposed on a part of light from the image display device 9b that is reflected by the non-polarizing beam splitter 4 to form a light beam 13L. Because ray paths of light emanating from the image display devices 9a and 9b are similar to each other, the following description will be given with respect to only the observer's right eye.

The light beam 13R enters a viewing optical system 6R having three surfaces decentered with respect to each other, in which at least one surface is a rotationally asymmetric aspherical surface. A space formed between the three surfaces is filled with an optical plastic material that is a substantially transparent optical medium having a refractive index of 1.5, for example. The light beam 13R exits from the viewing optical system 6R as an enlarged image, enters an observer's right eye 10R and forms the superimposed images of the image display devices 9a and 9b on the retina as an enlarged virtual image. The light beam 13L travels along a similar ray path in a symmetric relation to the light beam 13R and forms the superimposed images of the image display devices 9a and 9b on the retina of an observer's left eye 10L as an enlarged virtual image. Accordingly, light emitted from the light source 1 can be effectively utilized with a minimal loss of the light quantity, and the observer can view a bright image with both eyes at the same time.

Thus, the image display apparatus arranged as stated above provides the advantageous effect that an image of high resolution can be observed with both eyes at the same time with a relatively simple arrangement, in addition to the advantageous effect that the use of two image display devices makes it possible to present an image of high resolution.

An image display apparatus according to a further aspect of the present invention will be described below. FIG. 13 shows a delta array of pixels as an example of a pixel array used in a transmissive liquid crystal display device. As will be clear from the figure, a black space (black matrix) for concealing wiring is present on the liquid crystal image display device outside the openings of pixels of R, G and B. Accordingly, when this image display device is observed by enlarging it through a viewing optical system, the observed image appears to be rough and of low resolution. Therefore, two image display devices of equal resolution are used as the image display devices 9a and 9b, and the two image display devices 9a and 9b are arranged to display respective images such that the pixels of the second image display device 9b are displaced relative to the pixels of the first image display device 9a, and the two images are superimposed on one another. Consequently, the number of pixels becomes substantially double the number of pixels in the case of a single image display device. Thus, it is possible to observe an image of higher resolution and higher degree of smoothness.

In addition, a one-dimensional low-pass filter is provided in an optical path extending from the image display devices to the observer's eyes. The one-dimensional low-pass filter diffracts light in a direction approximately perpendicular to the direction in which the pixels of the second image display device 9b are displaced. Consequently, the pixels are divided also in a direction perpendicular to the direction of displacement of the pixels. Therefore, it is possible to obtain even smoother image quality.

In this image display apparatus, the optical system can be realized by employing any of the above-described arrangements. In the case of a viewing optical system of the type which comprises a relay optical system and an ocular optical system, which are separate from each other, it is particularly preferable to place a one-dimensional diffraction grating near the intermediate image position from the viewpoint of constructing the apparatus.

In this case, the way in which the pixels of the second image display device are displaced varies according to the pixel array of the image display devices. If each displaced pixel is displayed between a certain pixel and a pixel adjacent thereto, the area corresponding to the black matrix can be filled with the displayed pixels. Accordingly, roughness of the image can be favorably reduced.

Let us assume that the horizontal pixel pitch between each pair of adjacent pixels of the same color on the image display devices is Px, the vertical pixel pitch is Py, the amount of displacement of the pixels in the horizontal direction is Lx, and the amount of displacement of the pixels in the vertical direction is Ly. On this assumption, it is important to satisfy the following conditions:

$$0 < Lx < 1.0 Px \quad (1)$$

$$0 < Ly < 1.0 Py \quad (2)$$

As long as the above conditions are satisfied, one pixel of the second image display device can be placed between each pair of adjacent pixels of the same color. Therefore, the space between two pixels of the first image display device can be complemented by a pixel of the second image display device.

Incidentally, many of the presently existing transmissive liquid crystal display devices employ a delta array. Let us consider one pixel $R_{11}$ with reference to FIG. 14. A pixel that is closest to $R_{11}$ and of the same color as $R_{11}$ is $R_{12}$, which is off the upper right of $R_{11}$, or $R_{13}$, which is off the lower left of $R_{11}$. To produce a smooth image, a pixel $R_{21}$ of the second image display device should be placed between the pair of pixels, which are in close proximity to each other. The pixel $R_{21}$ is placed at just the midpoint position between $R_{11}$ and $R_{12}$ if the following conditions are satisfied:

$$Lx=0.5Px \qquad (3)$$

$$Ly=0.5Py \qquad (4)$$

where Px is the pixel pitch in the horizontal direction between each pair of adjacent pixels of the same color on the image display devices; Py is the pixel pitch in the vertical direction; Lx is the amount of horizontal displacement of the pixel $R_{21}$ of the second image display device relative to the pixel $R_{11}$ of the first image display device; and Ly is the amount of vertical displacement of the pixel $R_{21}$ relative to the pixel $R_{11}$.

However, if the above-described technique is adopted as it is, pixels of the same color link together in an oblique direction, i.e. $R_{11}$, $R_{21}$, $R_{12}$, . . . , and undesirably appear to be a mask of colored oblique lines, depending upon the configuration of the original image. Therefore, a one-dimensional diffraction grating is used which diffracts light in a direction approximately perpendicular to the direction in which the pixels of the second image display device are displaced. Alternatively, a micro-lens array capable of splitting light in that direction is used. By doing so, an effect similar to that of a low-pass filter can be obtained, as shown in FIG. 15. Thus, colored oblique lines are eliminated from the image to be observed. Because the number of pixels displayed in the observation image field increases, the resolution increases. Moreover, the effect of the low-pass filter is added. Consequently, an extremely smooth image for observation is obtained.

Incidentally, it has heretofore been necessary for conventional image display apparatuses to use a costly image display device having fine pixels arrayed at a high density in order to perform favorable tone reproduction. However, there has been no head-mounted image display apparatus of the type which makes good use of human visual characteristics to improve the quality of an image that is observed in the form of an enlarged image.

The following is a description of an image display apparatus according to a further aspect of the present invention. The human visual characteristics exhibit high visual sensitivity up to high resolution with respect to the luminance signal (luminance image) but have sensitivity only at low resolution with respect to the chrominance signal (chrominance image). In conformity to the visual characteristics, one of two image display devices is arranged to display only the luminance signal in a picture signal at high resolution, whereas the other image display device is arranged to perform display at low resolution by the chrominance signal in the picture signal. By doing so, a luminance image and a chrominance image are combined together in such a manner as to color a dense, monochrome gray-scale image, and thus a display image can be formed. An example of a stripe pixel array is shown in FIG. 16. Part (a) of FIG. 16 shows a pixel array on an image display device for the chrominance signal, and part (b) of FIG. 16 shows a pixel array on an image display device for the luminance signal.

Thus, it becomes possible to perform favorable tone reproduction at high resolution despite a relatively low-cost arrangement by separating the picture signal in conformity to the human visual characteristics and properly selecting a pixel density for each of the image display devices arranged to display the luminance signal and the chrominance signal, respectively, i.e. by properly selecting resolution for each image display device.

In the present invention, the optical system can be realized by employing any of the above-described arrangements. It is particularly preferable to use an arrangement in which an image display device displaying the luminance signal has high resolution, and an image display device displaying the chrominance signal has low resolution. By doing so, it is possible to attain an image display apparatus with minimized cost.

Another example of the image display apparatus according to the first aspect of the present invention is shown in FIG. 3. In the figure, a light source 1, illuminating optical systems 5a and 5b and image display devices 9a and 9b are the same as those in FIG. 1. The arrangement shown in FIG. 3 differs from the arrangement shown in FIG. 1 as follows. In a composite optical system 3, which has a viewing optical system and an optical coupling/separating element integrated together in one unit, a positive power is given to entrance surfaces 31a and 31b through which light from the image display devices 9a and 9b enter the composite optical system 3, and a positive power is also given to an exit surface 32 thereof. This is defined as a first unit of a relay optical system. The first unit, together with a positive lens 72 as a second unit, forms a relay optical system 7 with a reflecting mirror 16 interposed between the first unit and the positive lens 72. An intermediate image 11 formed by the relay optical system 7 is led to an observer's eyeball 10 by an ocular optical system 8 so as to be observable as an enlarged virtual image.

Another example of the image display apparatus according to the second aspect of the present invention is shown in FIG. 5. In the figure, the arrangements and functions of a light source 1, illuminating optical systems 5a and 5b, image display devices 9a and 9b and an optical coupling/separating element 4 are the same as those of the corresponding elements in FIG. 4. The arrangement shown in FIG. 5 differs from the arrangement shown in FIG. 4 in that each of right and left viewing optical systems comprises a relay optical system 7 (7R or 7L) that forms an image of an image display device in the air as an intermediate image, and an ocular optical system 8 (8R or 8L) that projects the image into one observer's eyeball as a real image.

In any of the above-described arrangements, the intermediate image 11 formed by the relay optical system 7 is an aerial image. Therefore, it is possible to form a real image having as large a size as desired to a certain extent. Furthermore, it is possible to shorten the focal length of the ocular optical system 8 by forming the intermediate image 11 near an entrance surface 81 of the ocular optical system 8. Accordingly, it is possible to relax restrictions on the wideness of the observation field angle, which is limited by the size of each of the image display devices 9a and 9b, and on the distance from each of the image display devices 9a and 9b to the observer's eyeball 10 in comparison to the arrangement in which the viewing optical system is formed from an ocular optical system alone. Thus, the design freedom of the optical system increases.

It should be noted that the optical coupling/separating element 4 is a non-polarizing beam splitter. The optical coupling/separating surface 40' is formed from a dielectric multilayer film. The proportions of reflection and transmission by the optical coupling/separating surface 40' are approximately the same independently of the state of polarization of light incident thereon. The optical coupling/separating surface 40' is placed between the image display devices 9a and 9b and between the viewing optical systems 6L and 6R. The optical coupling/separating surface 40' has an action by which images of the two image display devices 9a and 9b are superimposed on one another. Furthermore, because the optical coupling/separating element 4 is a non-polarizing beam splitter, light emanating from each of the image display devices 9a and 9b is reflected and transmitted in the approximate proportion 1:1. As a result, the superimposed images of the image display devices 9a and 9b exit from the optical coupling/separating element 4 in two orthogonal directions opposite to the directions of the incident light from the image display devices 9a and 9b. Accordingly, unlike the above-mentioned polarizing beam splitter, which has only the image combining effect, the non-polarizing beam splitter 40', which is an optical coupling/separating surface in this arrangement, couples and separates light in the viewing optical system extending from the image display devices 9a and 9b to the observer's eyeball 10. Thus, the non-polarizing beam splitter 40' has two actions, i.e. image combining action and image separating action.

Moreover, if the optical coupling/separating element is arranged in a rectangular prism configuration in which an optical coupling/separating surface is placed in a medium having a refractive index larger than 1, it is possible to shorten the air-reduced distance from the image display device to the viewing optical system.

Furthermore, because the entrance and exit surfaces can be placed approximately parallel to the image display devices, even if these surfaces are made concave or convex to form optical surfaces having power, the optical systems can be regarded as coaxial systems. Accordingly, these surfaces can be readily utilized as one surface of a viewing optical system or an illuminating optical system.

In addition, the optical coupling/separating element may be arranged to serve also as a viewing optical system, particularly an ocular optical system, by forming the entrance or exit surface thereof as a surface having a positive power. In such a case, it is possible for this optical element alone to substitute for an ocular optical system leading the image of the image display device to the observer's eyeball by giving a positive power to the entrance and exit surfaces as shown in Numerical Example 1 (described later). It is easy to perform aberration correction by using an optical element, e.g. a lens, in addition to the above-described constituent elements.

Furthermore, when a relay optical system is used in a viewing optical system, the relay optical system can be constructed by giving a positive power to the entrance and exit surfaces of the optical coupling/separating element to thereby form a first unit of the relay optical system and further placing one single lens as a second unit of the relay optical system, as shown in Numerical Example 2 (described later). This arrangement is useful in markedly reducing the number of constituent optical elements.

Furthermore, if a Fresnel lens surface is used for at least one surface of the optical coupling/separating element, power can be given to the surface even if it is a plane surface. Accordingly, it becomes possible to utilize a surface having power without increasing the size of the optical coupling/separating element.

As the first image display device 9a, an image display device of low resolution is used, and a viewing optical system for the image display device 9a is arranged to have a wide field angle. In other words, the viewing optical system is arranged to present a large image field. As the second image display device 9b, an image display device of high resolution is used. A viewing optical system for the image display device 9b is arranged to have a narrow field angle so that the image field of the image display device 9b can be presented in a part of the image field of the first image display device 9a. By combining together the two image fields, for example, only the central portion of the observation image field of the first image display device 9a can be made to provide high resolution. Moreover, the image display apparatus may be arranged such that a part of the image field at which the observer gazes is recognized by using a device for detecting the direction of the observer's line of sight, and only the gazed area and its vicinities are presented at high resolution.

Furthermore, the viewing optical system for the first image display device and the viewing optical system for the second image display device may be identical with each other. Alternatively, the two viewing optical systems may be arranged such that one of them provides a large display area, and the other a small display area.

The viewing optical system 6 leads the image of the image display device 9 to the observer's eyeball 10. One type of viewing optical system 6 comprises a relay optical system 7 and an ocular optical system 8. Another type of viewing optical system 6 is formed from only an ocular optical system. However, in either case, the ocular optical system projects a real image (the image of the image display device or an intermediate image) into the observer's eyeball 10 as an enlarged virtual image. Therefore, the ocular optical systems in the two different types of viewing optical system 6 can be regarded as the same optical system.

The ocular optical system constituting the viewing optical system will be described below.

The viewing optical system 6 in Examples 1 and 2 (described later) is integrated with an optical coupling/separating element to form a composite optical system 3. The viewing optical system 6 is a coaxial refracting optical system. Accordingly, the optical system has no aberration due to decentration and is capable of displaying an image of high quality with a simple arrangement and of being designed with relative ease, as stated above. However, if a large number of lenses are used to make aberration correction, the optical system increases in size and weight and projects from the observer's face to a greater extent. This is particularly disadvantageous when the image display apparatus is mounted on the observer's head.

Therefore, the viewing optical system, particularly the ocular optical system, is arranged in the form of a reflecting system. Consequently, the optical system can be disposed with a relatively high degree of freedom because the optical path is bent. In addition, it becomes possible to correct aberrations due to decentration favorably by using an aspherical surface or a rotationally asymmetric aspherical surface. In examples (described later), exclusive of Examples 1 and 2, the ocular optical system 8 of the viewing optical system 6 is a decentered prism in which a space formed between three rotationally asymmetric aspherical surfaces decentered with respect to each other is filled with a transparent optical medium having a refractive index of about 1.5.

In the decentered prism, the arrangement of a concave mirror and a convex mirror exhibits a favorable effect in correction of curvature of field, as detailed in Japanese Patent Application No. 5-264828, filed by the present applicant. A description of aberrations produced by a tilted concave mirror is given in Japanese Patent Application No. 6-127453. A description of astigmatism produced by a tilted concave mirror is given in Japanese Patent Application No. 6-211067, filed by the present applicant, and also in Japanese Patent Application No. 6-256676. A description of trapezoidal and bow-shaped image distortions produced by a tilted concave mirror is given in Japanese Patent Application Unexamined Publication (KOKAI) No. 5-303056.

It is detailed in Japanese Patent Application No. 9-318811 that the above-mentioned aberrations are corrected simultaneously and favorably by a decentered prism using a plane-symmetry free-form surface that has no axis of rotational symmetry in the surface nor out of the surface and that has only one plane of symmetry.

A free-form surface (FFS) used in the present invention is defined by the following equation. The Z-axis of the defining equation is the axis of the free-form surface.

$$Z = \Sigma_n \Sigma_m C_{nm} X^n Y^{n-m}$$

where $\Sigma_n$ indicates that n of $\Sigma$ is from 0 to k, and $\Sigma_m$ indicates that m of $\Sigma$ is from 0 to n.

In a case where a plane-symmetry free-form surface (i.e. a free-form surface having only one plane of symmetry) is defined by the equation expressing a free-form surface, when symmetry produced by the plane of symmetry is to be obtained in the X-axis direction, terms with odd-numbered powers of X are made zero (for example, the coefficients of the terms with odd-numbered powers of X are set equal to zero) To obtain symmetry produced by the plane of symmetry in the Y-axis direction, terms with odd-numbered powers of Y are made zero (for example, the coefficients of the terms with odd-numbered powers of Y are set equal to zero).

Assuming that k=7 (polynomial of degree 7), for example, a plane-symmetry free-form surface which is symmetric with respect to the X-axis direction is expressed by an expanded form of the above equation as follows:

$$\begin{aligned}
Z = \, & C_2 \\
& + C_3 Y + C_4 X \\
& + C_5 Y^2 + C_6 YX + C_7 X^2 \\
& + C_8 Y^3 + C_9 Y^2 X + C_{10} YX^2 + C_{11} X^3 \\
& + C_{12} Y^4 + C_{13} Y^3 X + C_{14} Y^2 X^2 + C_{15} YX^3 + C_{16} X^4 \\
& + C_{17} Y^5 + C_{18} Y^4 X + \\
& \quad C_{19} Y^3 X^2 + C_{20} Y^2 X^3 + C_{21} YX^4 + C_{22} X^5 \\
& + C_{23} Y^6 + C_{24} Y^5 X + C_{25} Y^4 X^2 + C_{26} Y^3 X^3 + \\
& \quad C_{27} Y^2 X^4 + C_{28} YX^5 + C_{29} X^6 \\
& + C_{30} Y^7 + C_{31} Y^6 X + C_{32} Y^5 X^2 + C_{33} Y^4 X^3 + \\
& \quad C_{34} Y^3 X^4 + C_{35} Y^2 X^5 + C_{36} YX^6 + C_{37} X^7
\end{aligned} \quad (a)$$

In the above equation (a), the coefficients $C_4, C_6, C_9 \ldots$ of the terms with odd-numbered powers of X are set equal to zero (see numerical examples described later).

The use of a decentered prism having such a rotationally asymmetric aspherical surface as an ocular optical system makes it possible to present the observer a bright and high-resolution image with a wide observation field angle despite a compact and lightweight system. The decentered prism used as an ocular optical system does not always need to be formed from three surfaces, as described later with regard to examples of decentered prisms. It is only necessary that a space formed between two or more surfaces should be filled with a medium having a refractive index larger than 1.

Any of the illuminating optical systems in FIGS. 1 to 5 is either a common illuminating optical system or a combination of two illuminating optical systems provided approximately in symmetrical relation to each other with respect to a light source so that the illuminating light intensities of the two optical systems are equal to each other. In a case where one light source is used for one image display device as in ordinary liquid crystal display devices, it is necessary, in order to allow the image display devices 9a and 9b to simultaneously display images by picture signals generated from the same picture signal input externally, to synchronize the images in the same field, even if the images of the image display devices 9a and 9b are different from each other. If the images of the two image display devices are not synchronized, a time lag between the two images causes flicker, which makes the combined images difficult to see. Therefore, in a case where two image display devices are provided with independent illuminating light sources, respectively, the light sources must be controlled to emit light in synchronism with each other. However, the arrangement of the illuminating optical system according to the present invention makes it unnecessary to attain such synchronization because a single light source is used for the two image display devices. Thus, it will be obvious that the load on the electric circuit is reduced, and the electric power consumed is minimized.

In examples (described later), an illuminating optical system used for a transmissive image display device is arranged such that a space formed between three surfaces decentered with respect to an optical axis is filled with an optical medium having a refractive index larger than 1 (e.g. 1.5). An optical system using a tilted or decentered surface suffers aberrations (coma, astigmatism, image distortion, curvature of field, etc.) due to decentration, which cannot be corrected by a conventional rotationally symmetric aspherical surface. According to the present invention, however, an illuminating optical system that illuminates an irradiated surface with light emitted from a light source is formed from a decentered prism having at least two surfaces. The illuminating optical system uses a free-form surface [defined by equation (a)], which is a rotationally asymmetric surface, to correct simultaneously and favorably the above-described various aberrations due to decentration. A description of an illuminating optical system having this arrangement is given in detail in Japanese Patent Application No. 5-264828, filed by the present applicant.

An illuminating optical system arranged in another form according to the present invention is a decentered prism in which a space formed between at least three surfaces decentered with respect to each other is filled with an optical medium having a refractive index larger than 1. At least one of the surfaces constituting the decentered prism is a Fresnel lens surface. This arrangement enables the illuminating optical system to be corrected for aberrations and makes it possible to reduce the size, particularly the thickness of the illuminating optical system.

In the image display apparatus according to the present invention, two image display devices are used, and images of the two image display devices are superimposed on one another to form a composite image for observation. Accordingly, the optical path length of the viewing optical system becomes long, depending upon the arrangement of the optical system. The larger the image field for observation, the greater the dynamic presence and powerfulness of the image. This is, in some cases, favorable for image display apparatuses. To obtain a large observation image field, the observation field angle of the ocular optical system must be large. In other words, it is favorable for the ocular optical system to have a short focal length. Therefore, when the optical path is long, the image of the image display device is once formed in the air as a real image by a relay optical system, and the intermediate image is led to an observer's eyeball by the ocular optical system. By doing so, the focal length of the ocular optical system can be shortened. In other words, it becomes possible to observe a large image field.

In the viewing optical system shown in FIG. 5, the optical coupling/separating element 4 is in the shape of a rectangular prism. The relay optical system 7 can be designed as a coaxial system. The relay optical system 7 comprises a first unit 71 (optical coupling/separating element 4), in which the entrance and exit surfaces of a rectangular prism are given a positive power and which is optically a positive lens, and a second unit 72 (72R or 72L), which is a biconvex positive lens. The relay optical system 7 forms an intermediate image 11 of each of the image display devices 9a and 9b near the entrance surface 81 of each of the ocular optical systems 8L and 8R.

In the viewing optical system shown in FIG. 6 (described later in detail), the optical coupling/separating element 4 is a half-mirror 4", and the relay optical system 7 comprises two units of two lenses, i.e. positive lenses 71 and 72. In this arrangement, because the direction of the image led by the ocular optical system 8 is decentered, the relay optical system 7 is tilted with respect to the optical axis in conformity to the direction of the image. Thus, a decentered relay optical system 7 is constructed.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 16(a) and 16(b) are diagrams showing a pixel array on an image display device for a chrominance signal and a pixel array on an image display device for a luminance signal in the case of a stripe array of pixels.

DESCRIPTION OF THE PREFERRED EMBODIMENTS

Figure 1:
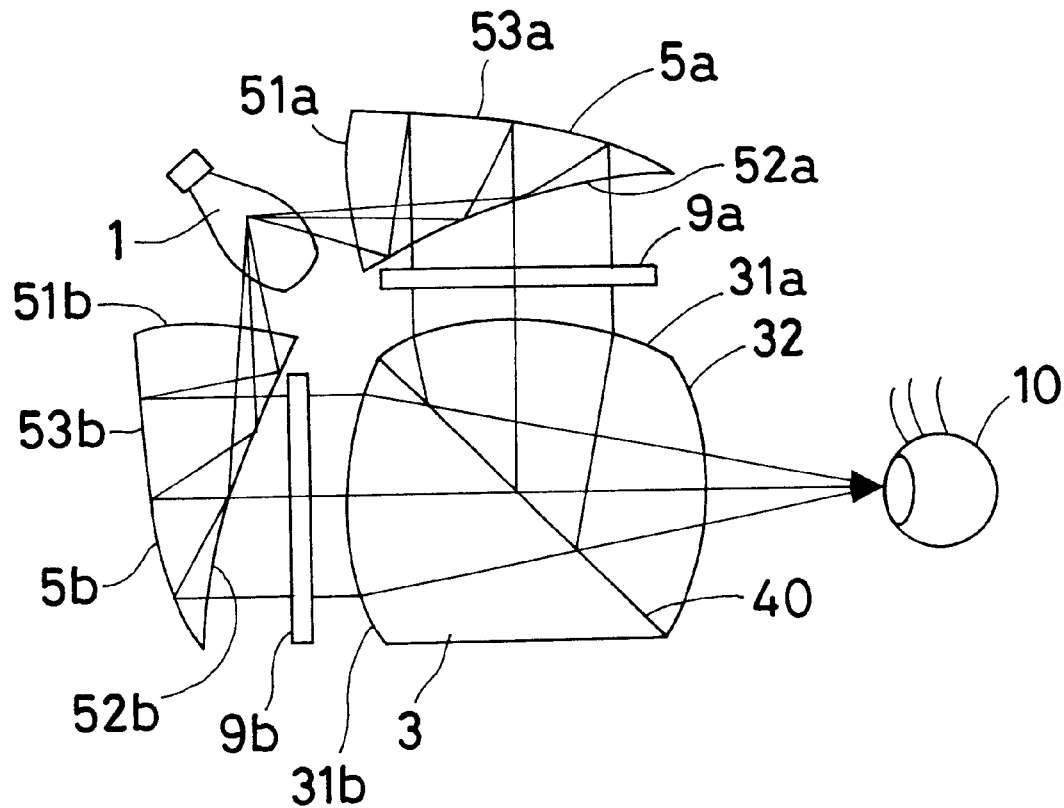
FIG. 1 is a diagram showing the arrangement of Example 1 of the image display apparatus according to the present invention.

Examples 1 to 6 and Numerical Examples 1 to 5 of the image display apparatus according to the present invention will be described below.

In the following examples and numerical examples, reference numerals denote respective constituent elements as follows. Reference numeral 1 denotes a light source; 2 an optical axis; 3, 3' composite optical systems; 4 an optical coupling/separating element; 5 an illuminating optical system; 6 a viewing optical system; 7 a relay optical system; 8 an ocular optical system; 9 an image display device; 10 an observer's eyeball; 11 an intermediate image of the image display device; 13 a light beam; 15 an exit pupil; 16 a reflecting mirror; 31 a first surface of the composite optical system; 32 a second surface of the composite optical system; 33 a third surface of the composite optical system; 34 a fourth surface of the composite optical system; 40, 40' optical coupling/separating surfaces; 41 an entrance surface of the optical coupling/separating element; 42 an exit surface of the optical coupling/separating element; 51 a first surface of the illuminating optical system; 52 a second surface of the illuminating optical system; 53 a third surface of the illuminating optical system; 61 a first surface of the viewing optical system; 62 a second surface of the viewing optical system; 63 a third surface of the viewing optical system; 71 a first unit of the relay optical system; 72 a second unit (positive lens) of the relay optical system; 81 a first surface of the ocular optical system; 82 a second surface of the ocular optical system; and 83 a third surface of the ocular optical system. It should be noted that in a case where it is necessary to make a distinction between a pair of elements for the right and left eyes of an observer, R or L is added to the end of the relevant reference numeral.

Example 1 of the image display apparatus according to the present invention is shown in FIG. 1. In the figure, illuminating optical systems 5a and 5b respectively have first surfaces 51a and 51b through which light emitted from a light source 1 enter the illuminating optical systems 5a and 5b, second surfaces 52a and 52b facing opposite to the first surfaces 51a and 51b and having both reflecting and transmitting actions, and third surfaces 53a and 53b, which are reflecting surfaces. A space formed between the three surfaces 51a, 52a and 53a and a space formed between the three surfaces 51b, 52b and 53b are each filled with an optical plastic material that is a substantially transparent optical medium having a refractive index of approximately 1.5. The illuminating optical systems 5a and 5b illuminate the respective display surfaces of transmissive liquid crystal display devices 9a and 9b as image display devices from the rear.

The transmissive liquid crystal display devices 9a and 9b are twisted nematic liquid crystal display devices (TN liquid crystal display devices). In this case, the twist angle is set at 90 degrees. Therefore, the direction of polarization of light emanating from each of the two liquid crystal display devices is rotated through 90 degrees from the incident light by the above-described phenomenon. The directions of polarization of light emanating from the two image display devices 9a and 9b are set so that S and P waves, which are in an orthogonal relation to each other, emerge from the image display devices 9a and 9b, respectively.

The composite optical system 3 has the optical coupling/separating action whereby images of the two image display devices 9a and 9b are combined together to form a composite image, and further has the action of a viewing optical system whereby the composite image of the image display devices 9a and 9b is projected into the observer's eyeball 10. Regarding the optical coupling/separating action, a polarizing half-mirror surface 40 reflects the S wave emanating from the image display device 9a and transmits the P wave emanating from the image display device 9b, as has been stated above. Accordingly, light emanating from the two image display devices 9a and 9b can be led to the observer's eyeball 10 with a minimal loss of the light quantity.

On the other hand, the composite optical system 3 implements the action of a viewing optical system as follows. The composite optical system 3 is in the form of a rectangular prism having entrance surfaces 31a and 31b through which light from the image display devices 9a and 9b enter the prism, respectively, and further having an exit surface 32 on the observer side. All the surfaces 31a, 31b and 32 have a positive power, and the powers of the entrance surfaces 31a and 31b are set identical with each other. Therefore, the focal lengths of the optical systems extending from the two image display devices 9a and 9b to the observer's eyeball 10 are equal to each other. Consequently, both the images of the two image display devices 9a and 9b are formed on the retina of the observer's eyeball 10 at the same magnification.

Figure 2:
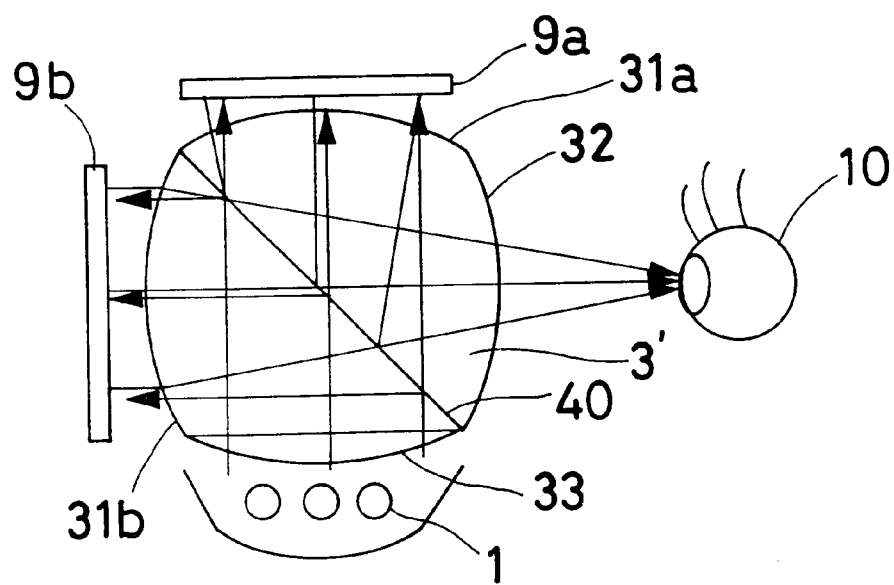
FIG. 2 is a diagram showing the arrangement of Example 2 of the image display apparatus according to the present invention.

Example 2 of the image display apparatus according to the present invention is shown in FIG. 2. Referring to the figure, the image display apparatus has two reflective liquid crystal display devices 9a and 9b and a composite optical system 3' in which a polarizing half-mirror surface 40 as an optical coupling/separating surface is placed in an optical plastic material that is a transparent optical medium having a refractive index of approximately 1.5. The composite optical system 3' has an entrance surface 33 through which light from a light source 1 enters the optical system 3', entrance surfaces 31a and 31b through which image light from the image display devices 9a and 9b enters the optical system 3', and an exit surface 32 on the observer side. All the surfaces 31a, 31b, 32 and 33 have a positive power. The optical system 3' performs the functions of an optical coupling/separating element, an illuminating optical system and a viewing optical system, as has been stated above.

A polarizing half-mirror surface 40 in the composite optical system 3' is tilted at approximately 45 degrees with respect to the light source 1. Therefore, light emitted from the light source 1 is separated by the polarizing half-mirror surface 40 into S wave (reflected light) and P wave (transmitted light), which are orthogonal polarized light components. The S and P waves are led to the two image display devices 9a and 9b to illuminate them simultaneously. The image display devices 9a and 9b are TN liquid crystal display devices. In this case, the twist angle is set at 45 degrees. Illuminating light that is in a random polarization condition is formed into linearly polarized light by the polarizing half-mirror surface 40 and enters each liquid crystal display device in this state of polarization. The incident light passes through pixels of the liquid crystal display device to which a voltage is being applied. The light further passes through the liquid crystal layer of the liquid crystal display device and is reflected at the lower part thereof. Thus, the direction of polarization is rotated through 90 degrees, and the light modulated in this way emanates from the liquid crystal display device. Accordingly, in a case where the incident light is S wave, for example, light modulated by the liquid crystal display device emanates therefrom as P wave. The polarizing half-mirror surface 40 has been set so as to reflect S wave and transmit P wave. In this case, P wave enters the image display device 9a and is optically modulated and reflected thereby. The light, which is now S wave, reenters the composite optical system 3' and is reflected by the optical coupling/separating surface 40 to reach the observer's eyeball 10. On the other hand, S wave enters the image display device 9b and is optically modulated and reflected thereby. The light, which is now P wave, passes through the optical coupling/separating surface 40 and exits from the exit surface 32 of the composite optical system 3' to reach the observer's eyeball 10. Accordingly, light emitted from the light source can be effectively utilized with a minimal loss of the light quantity, and it is possible to observe a bright image.

Light from the image display devices 9a and 9b is led to the observer's eyeball 10 as approximately parallel beams by the positive powers of the entrance surfaces 31a and 31b of the composite optical system 3', which are closer to the image display devices 9a and 9b, and the exit surface 32 on the observer side. Accordingly, the observer can view the superimposed images of the image display devices 9a and 9b as an enlarged virtual image.

Figure 3:
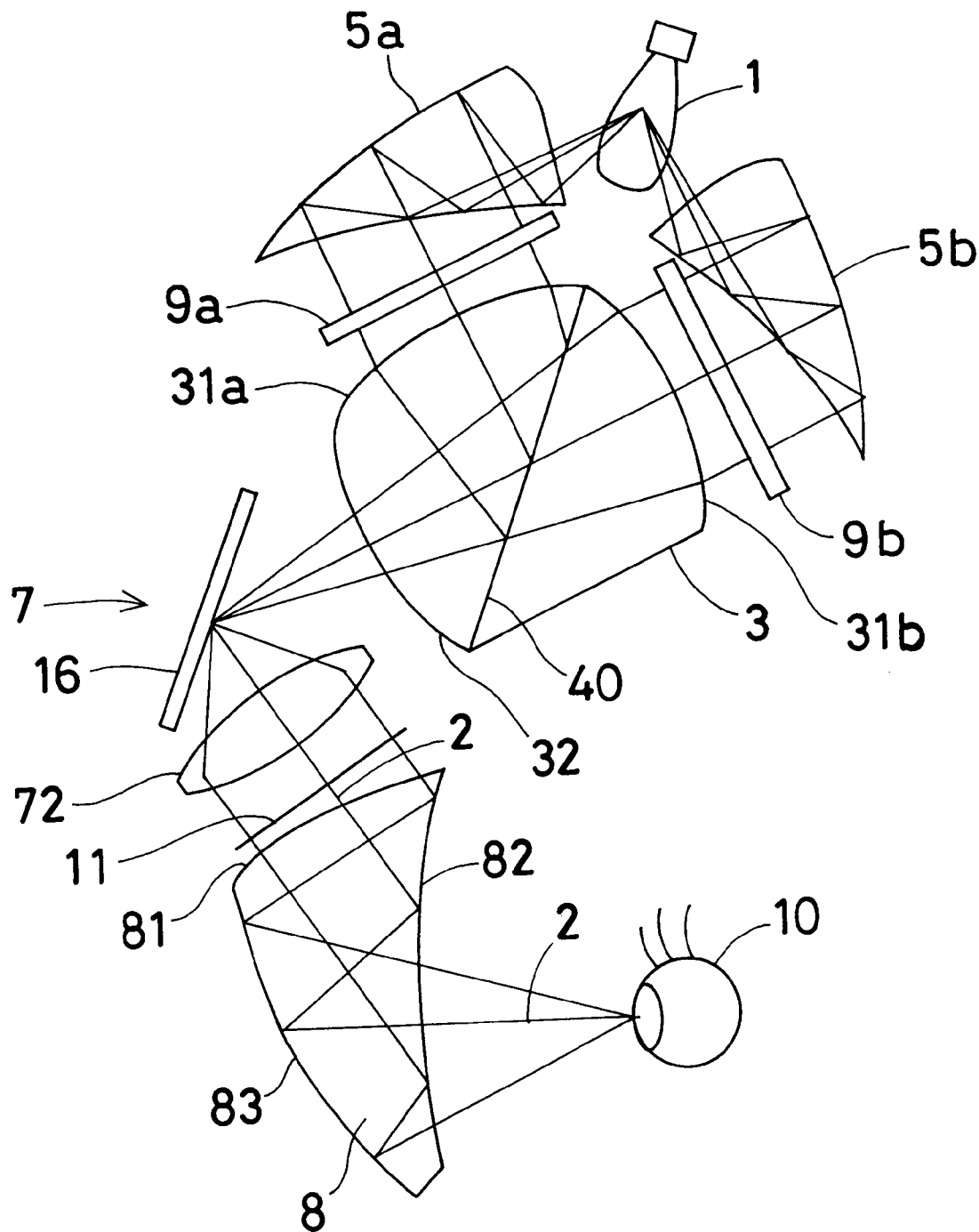
FIG. 3 is a diagram showing the arrangement of Example 3 of the image display apparatus according to the present invention.

Example 3 of the image display apparatus according to the present invention is shown in FIG. 3. In a viewing optical system shown in this figure, a composite optical system 3 has entrance surfaces 31a and 31b and an exit surface 32. All the surfaces 31a, 31b and 32 have a positive power to form a first unit 71 of a relay optical system 7. A positive lens forms a second unit 72 of the relay optical system 7, with a reflecting mirror 16 interposed between the first and second units 71 and 72. The relay optical system 7 forms an intermediate image 11 of the superimposed images of two image display devices 9a and 9b near an entrance surface 81 of an ocular optical system 8. The ocular optical system 8 has three rotationally asymmetric aspherical surfaces 81 to 83, which are decentered with respect to an optical axis 2. A space formed between the three surfaces 81 to 83 is filled with an optical plastic material having a refractive index of approximately 1.5. A light beam from the intermediate image 11 enters the ocular optical system 8 through the first surface 81 as an entrance surface and is internally reflected by the second surface 82. At this time, the light is totally reflected at an area where the angle of reflection is set not smaller than the critical angle. At an area where the reflection angle is smaller than the critical angle, the light is internally reflected by a surface coated with a reflective coating material of high reflectivity, e.g. aluminum. The light internally reflected by the second surface 82 is reflected by the third surface 83 and exits from the ocular optical system 8 while being refracted through the second surface 82. The light enters an observer's eyeball 10 and forms on the retina an enlarged virtual image of the intermediate image 11, in which the images of the image display devices 9a and 9b are superimposed on one another.

Figure 4:
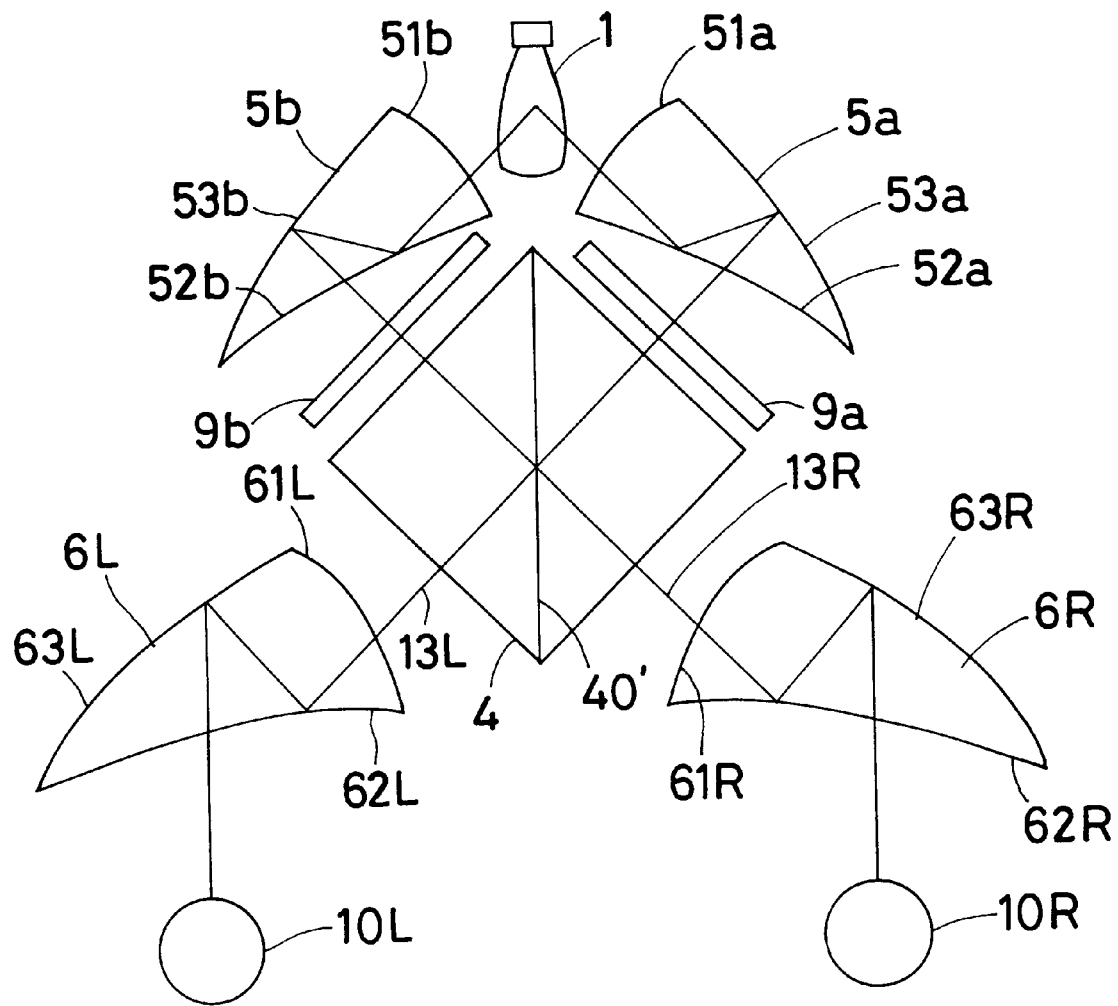
FIG. 4 is a diagram showing the arrangement of Example 4 of the image display apparatus according to the present invention.

FIG. 4 shows Example 4, which is a first embodiment of the image display apparatus according to the second aspect of the present invention. In the figure, illuminating optical systems 5a and 5b respectively have first surfaces 51a and 51b through which light emitted from a light source 1 enter the illuminating optical systems 5a and 5b, second surfaces 52a and 52b facing opposite to the first surfaces 51a and 51b and having both reflecting and transmitting actions, and third surfaces 53a and 53b, which are reflecting surfaces. A space formed between the three surfaces 51a, 52a and 53a and a space formed between the three surfaces 51b, 52b and 53b are each filled with an optical plastic material that is a substantially transparent optical medium having a refractive index of approximately 1.5. The illuminating optical systems 5a and 5b illuminate the respective display surfaces of transmissive liquid crystal display devices 9a and 9b from the rear.

The transmissive liquid crystal display devices 9a and 9b are TN liquid crystal display devices. In this case, the twist angle is 90 degrees, for example. However, the twist angle is not necessarily limited thereto.

An optical coupling/separating element 4 is a non-polarizing beam splitter. An optical coupling/separating surface 40' is formed from a dielectric multilayer film, for example. The proportions of reflection and transmission by the optical coupling/separating surface 40' are approximately the same independently of the state of polarization of light incident thereon. The optical coupling/separating surface 40' is placed between the image display devices 9a and 9b and between viewing optical systems 6L and 6R. The optical coupling/separating surface 40' has an action by which images of the two image display devices 9a and 9b are superimposed on one another. The optical coupling/separating surface 40' further has an action through which the superimposed images exit in two orthogonal directions.

The viewing optical systems 6L and 6R correspond to observer's left and right eyes, respectively. The arrangements of the viewing optical systems 6L and 6R are similar to each other. Therefore, the following description will be given with regard to only the right eye. The viewing optical system 6R has a first surface 61R through which light emanating from the image display devices 9a and 9b, which are transmissive liquid crystal display devices, enters the viewing optical system 6R through the optical coupling/separating element 4. The viewing optical system 6R furthers has a second surface 62R, which is a surface facing opposite to the first surface 61R and having both reflecting and transmitting actions, and a third surface 63R, which is a reflecting surface having a positive power. A space formed between the three surfaces 61R, 62R and 63R is filled with an optical plastic material that is a substantially transparent optical medium having a refractive index of approximately 1.5. All the surfaces 61R, 62R and 63R are rotationally asymmetric aspherical surfaces, which are expressed by equation (a), for example. The surfaces 61R, 62R and 63R are decentered with respect to an optical axis to form a decentered prism configuration.

The actual path of light rays is as follows. Light emitted from the light source 1 enters the illuminating optical systems 5a and 5b through the first surfaces 51a and 51b, which are entrance surfaces thereof, and is internally reflected by the second surfaces 52a and 52b. At this time, the light is totally reflected at an area of each of the second surfaces 52a and 52b through which illuminating light exits because in this area the angle of reflection is set not smaller than the critical angle. On the other hand, there is light reflected at an angle smaller than the critical angle in an area through which no illuminating light exits. Therefore, the surface of this area is coated with a reflective coating material of high reflectivity, e.g. aluminum. After being internally reflected by the second surfaces 52a and 52b, the light is reflected by the third surfaces 53a and 53b and exits from the illuminating optical systems 5a and 5b while being refracted through the second surfaces 52a and 52b, to illuminate the image display devices 9a and 9b.

The images of the image display devices 9a and 9b are effectively superimposed on one another by the non-polarizing beam splitter 4 having the non-polarizing half-mirror surface 40' that transmits a part of incident light from the image display devices 9a and 9b and reflects a part of the incident light. That is, a part of light from the image display device 9a passes through the non-polarizing beam splitter 4 and forms a light beam 13L in which it is superimposed on a part of light from the image display device 9b that is reflected by the non-polarizing beam splitter 4. On the other hand, a part of light from the image display device 9a is reflected by the non-polarizing beam splitter 4 and forms a light beam 13R in which it is superimposed on a part of light from the image display device 9b that passes through the non-polarizing beam splitter 4.

The light beam 13R enters the viewing optical system 6R through the first surface 61R, which is an entrance surface, and is internally reflected by the second surface 62R. At this time, the light is totally reflected at an area of the second surface 62R where the angle of reflection is set not smaller than the critical angle. At an area of the second surface 62R where the reflection angle is smaller than the critical angle, the light is internally reflected by a surface coated with a reflective coating material of high reflectivity, e.g. aluminum. The light internally reflected by the second surface 62R is reflected by the third surface 63R and exits from the viewing optical system 6R while being refracted through the second surface 62R. The light enters the observer's right eye 10R and forms the superimposed images of the image display devices 9a and 9b on the retina as an enlarged virtual image. The light beam 13L passes along a similar ray path in a symmetric relation to the light beam 13R and forms the superimposed images of the image display devices 9a and 9b on the retina of the observer's left eye 10L as an enlarged virtual image.

Figure 5:
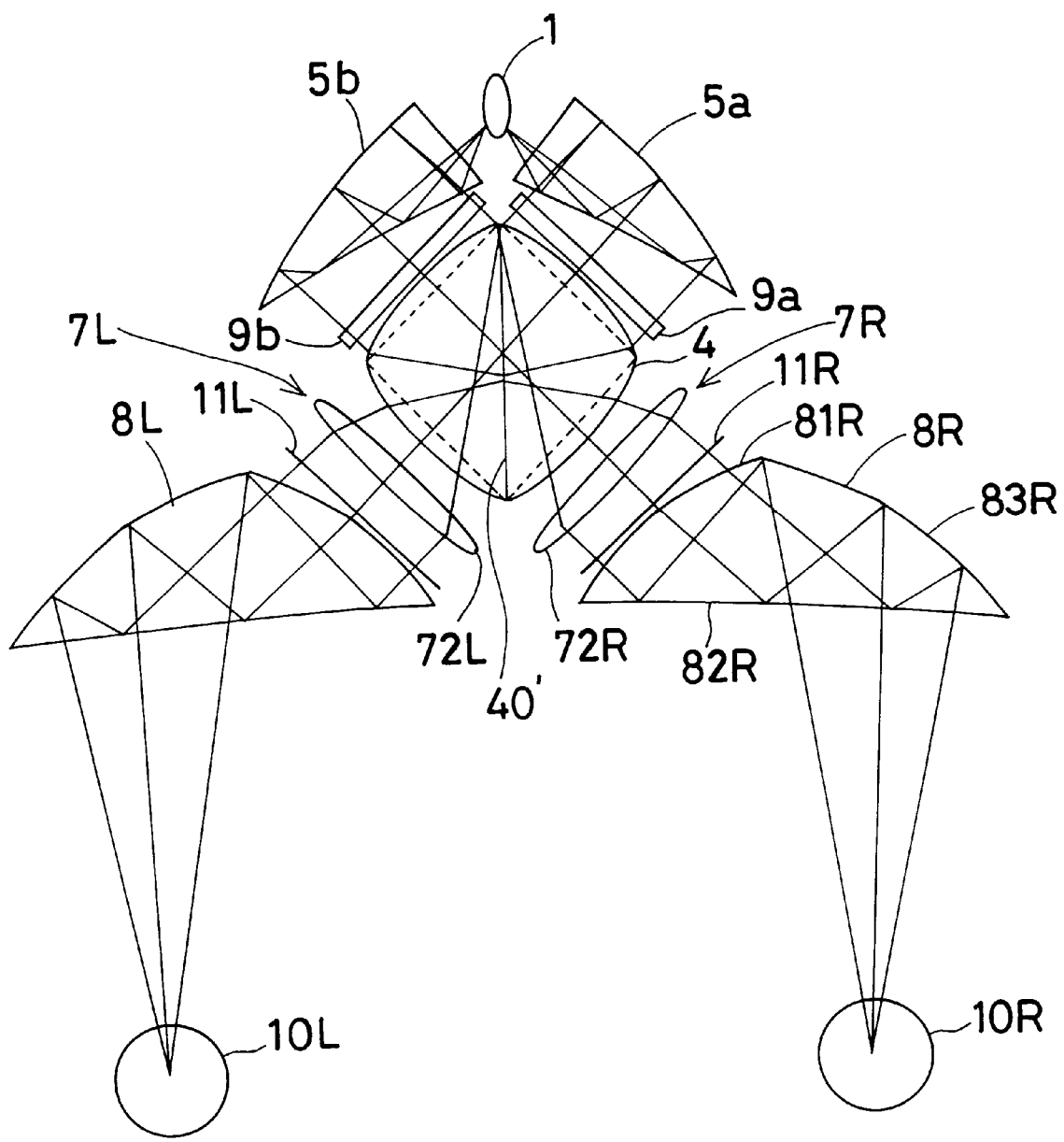
FIG. 5 is a diagram showing the arrangement of Example 5 of the image display apparatus according to the present invention.

FIG. 5 shows Example 5, which is a second embodiment of the image display apparatus according to the second aspect of the present invention. In the figure, the arrangements and functions of a light source 1, illuminating optical systems 5a and 5b, image display devices 9a and 9b and an optical coupling/separating element 4 are similar to those of the constituent elements shown in FIG. 4. Therefore, a description thereof is omitted. This example differs from the example shown in FIG. 4 in the arrangement of the viewing optical system. In this example, a viewing optical system comprises a relay optical system 7 that forms an intermediate image of the image of the image display device in the air, and an ocular optical system 8 that projects the intermediate image into an observer's eyeball as a real image.

The actual path of light rays from the image display device 9 to the observer's eyeball 10 is as follows. Light emanating from the image display device 9 enters the optical coupling/separating element 4 through a lens 71 in a first unit of the relay optical system 7. Images of the image display devices 9a and 9b are effectively superimposed on one another by a non-polarizing half-mirror surface 40'. That is, a part of light from the image display device 9a passes through the non-polarizing beam splitter 4 and forms a light beam 13L in which it is superimposed on a part of light from the image display device 9b that is reflected by the non-polarizing beam splitter 4. On the other hand, a part of light from the image display device 9a is reflected by the non-polarizing beam splitter 4 and forms a light beam 13R in which it is superimposed on a part of light from the image display device 9b that passes through the non-polarizing beam splitter 4. The light beam 13R enters an ocular optical system 8R through a second unit 72R of the relay optical system 7. At this time, the relay optical system 7 forms an intermediate image 11R of the superimposed images of the image display devices 9a and 9b in the vicinity of an entrance surface 81R of the ocular optical system 8R.

The light beam 13R enters the ocular optical system 8R through a first surface 81R, which is an entrance surface thereof, and is internally reflected by a second surface 82R. At this time, the light beam 13R is totally reflected at an area of the second surface 82R where the angle of reflection is set not smaller than the critical angle. At an area where the reflection angle is smaller than the critical angle, the light beam 13R is internally reflected by a surface coated with a reflective coating material of high reflectivity, e.g. aluminum. The light internally reflected by the second surface 82R is reflected by a third surface 83R and exits from the ocular optical system 8R while being refracted through the second surface 82R. The light enters an observer's right eyeball 10R and forms on the retina an enlarged virtual image of the intermediate image 11R, in which the images of the image display devices 9a and 9b are superimposed on one another. The light beam 13L travels along a similar ray path in a symmetric relation to the light beam 13R and forms the superimposed images of the image display devices 9a and 9b on the retina of an observer's left eyeball 10L as an enlarged virtual image.

Figure 6:
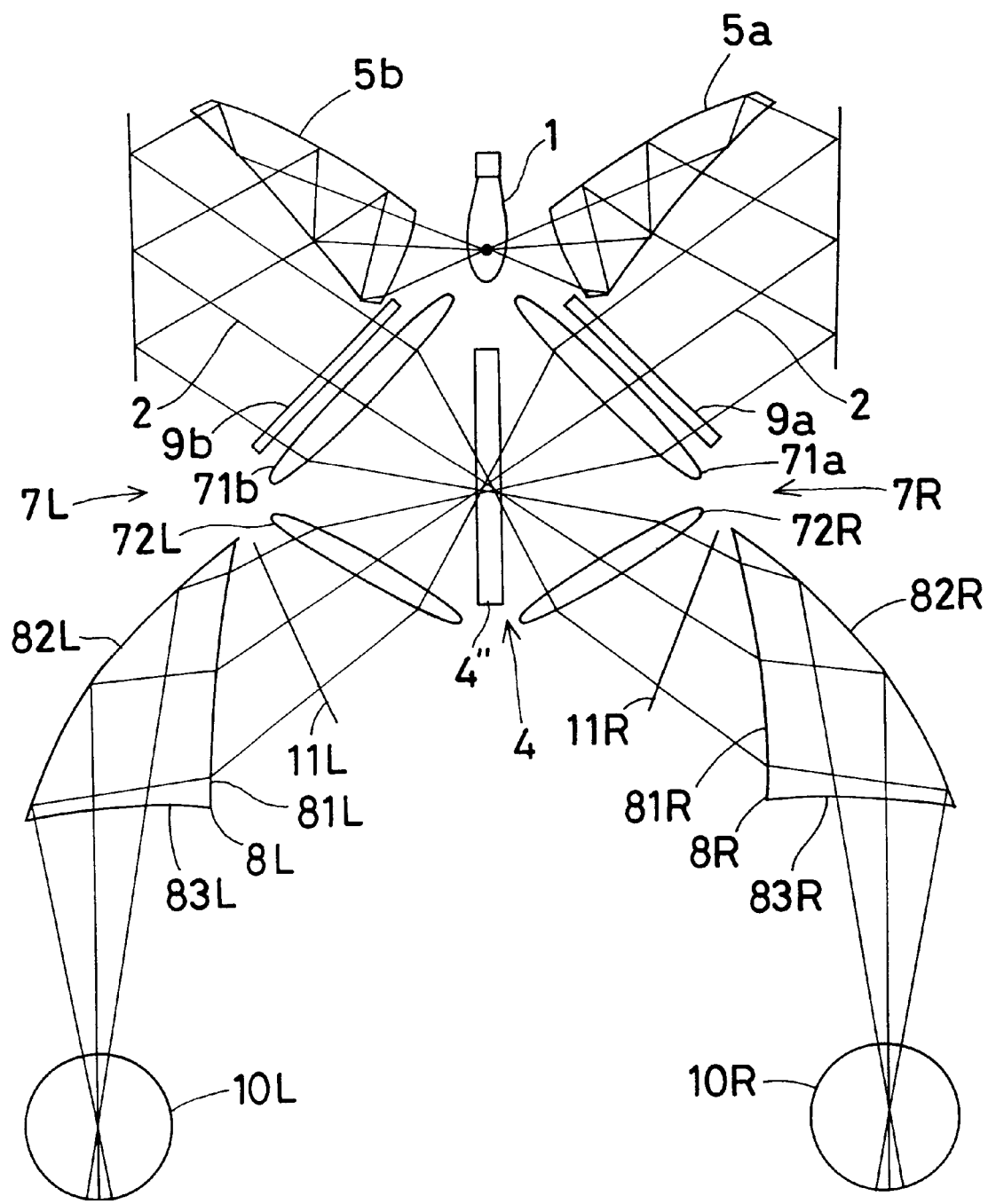
FIG. 6 is a diagram showing the arrangement of Example 6 of the image display apparatus according to the present invention.

FIG. 6 shows Example 6, which is a third embodiment of the image display apparatus according to the second aspect of the present invention. In the figure, the arrangements and functions of a light source 1, illuminating optical systems 5a and 5b and image display devices 9a and 9b are similar to those of the constituent elements shown in FIG. 5. Therefore, a description thereof is omitted. This example differs from the example shown in FIG. 5 in the arrangements of an optical coupling/separating element 4 and a viewing optical system (a relay optical system 7 and an ocular optical system 8).

The optical coupling/separating element 4 is a non-polarizing half-mirror 4". This enables the optical coupling/separating element 4 to be reduced in both size and weight in comparison to the rectangular prism configuration.

A relay optical system 7 has two units comprising two positive lenses that are decentered (tilted) with respect to an optical axis 2, with the optical coupling/separating element 4 interposed between the two lenses. The relay optical system 7 forms an intermediate image 11 tilted with respect to the optical axis 2. The intermediate image 11 is projected into an observer's eyeball 10 as an enlarged virtual image by an ocular optical system 8. The ocular optical system 8 has three surfaces 81 to 83 decentered with respect to the optical axis 2. A space formed between the three surfaces 81 to 83 is filled with an optical plastic material having a refractive index of approximately 1.5. The ocular optical system 8 projects the intermediate image 11 into the observer's eyeball 10 as an enlarged virtual image.

In both the optical paths for the left and right eyes, a light beam from the intermediate image 11 enters the ocular optical system 8 through a first surface 81, which is an entrance surface thereof, and is internally reflected by a second surface 82. The reflected light exits from the ocular optical system 8 while being refracted through a third surface 83. Then, the light enters the observer's eyeball 10 and forms the superimposed images of the image display devices 9a and 9b on the retina as an enlarged virtual image.

Numerical Examples 1 to 5 will be described below. Specific constituent parameters will be shown later.

Figure 7:
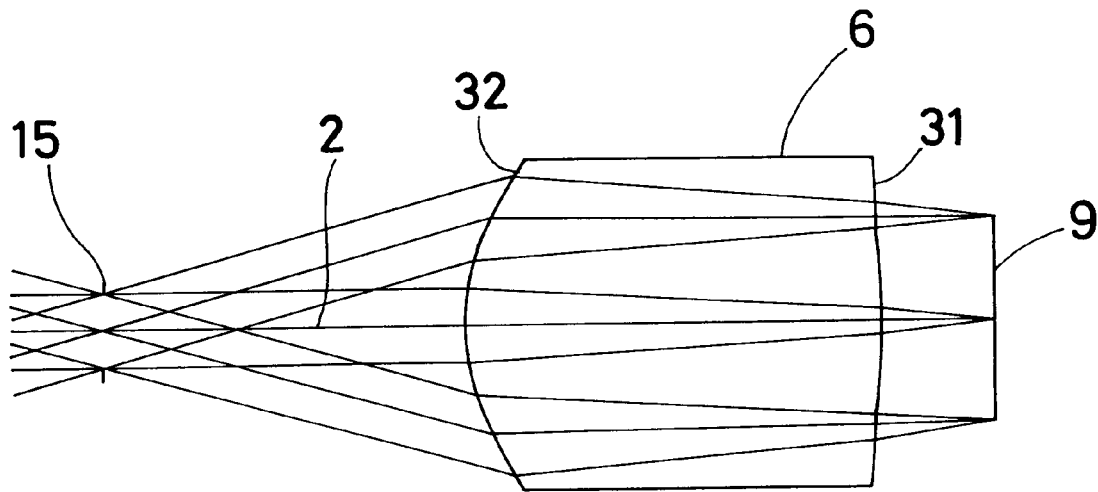
FIG. 7 is a ray path diagram showing Numerical Example 1 of the present invention.

FIG. 7 illustrates a backward ray trace in Numerical Example 1 of the present invention. This numerical example is concerned with only the viewing optical system 6 (composite optical system 3) in the arrangement shown in FIG. 1. FIG. 7 shows a part of the arrangement extending from the image display device 9 to the exit pupil 15. Two surfaces 31 and 32 constituting the viewing optical system 6 are both rotationally symmetric aspherical surfaces. Regarding the observation field angles, the horizontal field angle is 40 degrees, and the vertical field angle is 30.6 degrees. The exit pupil diameter is 4 millimeters.

Figure 8:
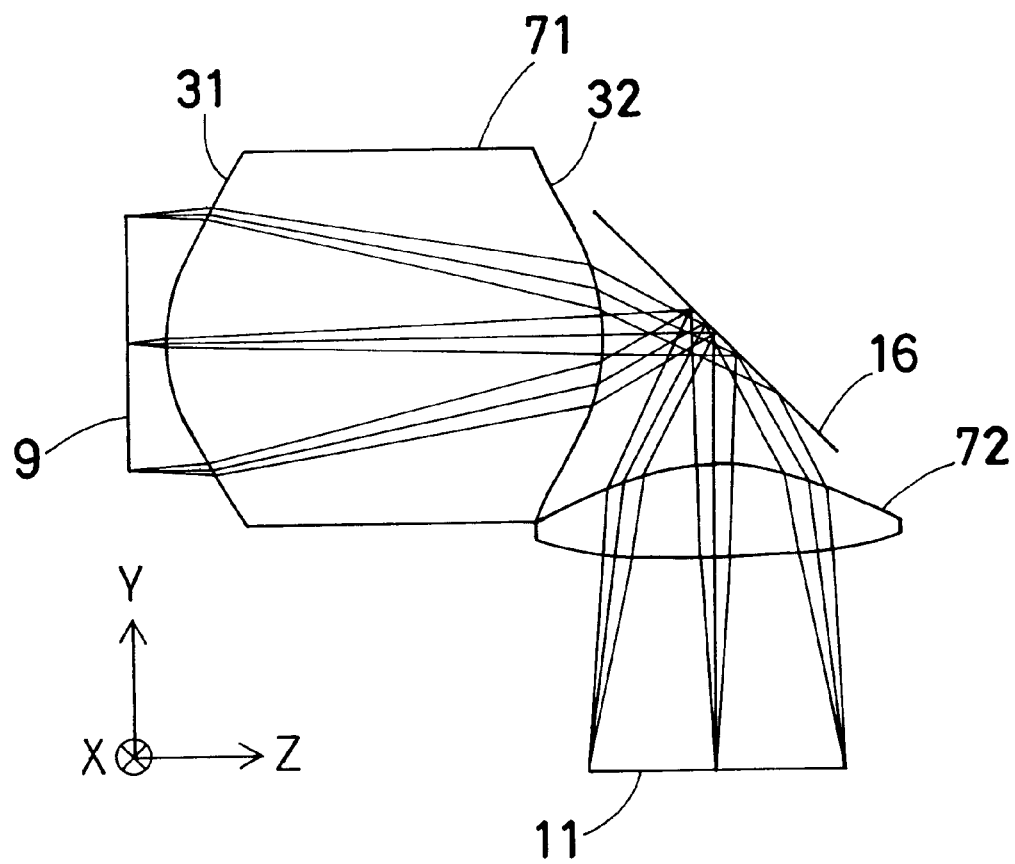
FIG. 8 is a ray path diagram showing a relay optical system according to Numerical Example 2 of the present invention.
Figure 9:
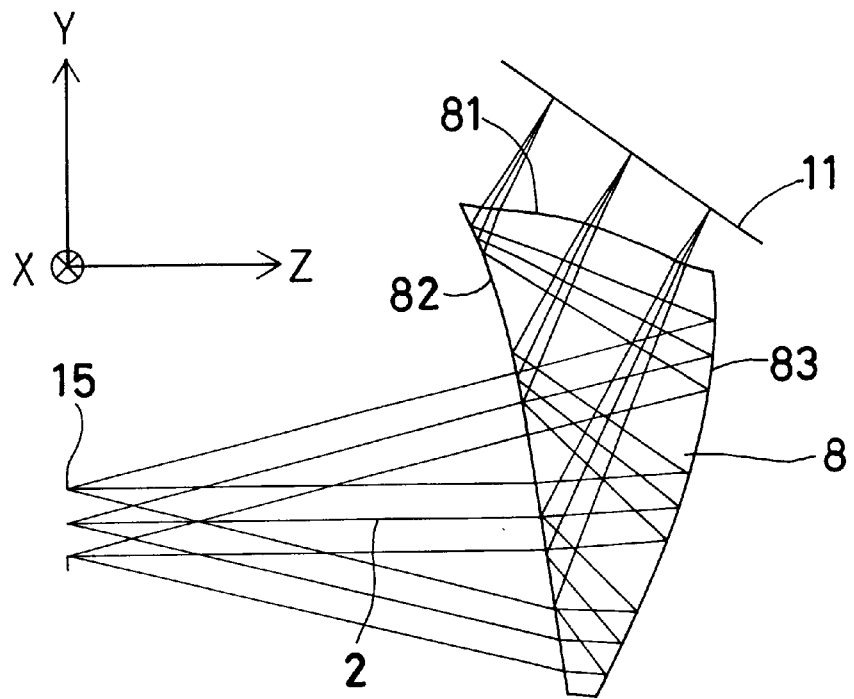
FIG. 9 is a ray path diagram showing an ocular optical system according to Numerical Example 2 of the present invention.

Optical ray traces in Numerical Example 2 of the present invention are illustrated in FIGS. 8 and 9. FIG. 8 illustrates a forward ray trace, and FIG. 9 a backward ray trace. This numerical example is concerned with the arrangement shown in FIG. 3. A relay optical system extending from the image display device 9 to the intermediate image 11 is shown in FIG. 8. The ocular optical system 8, which extends from the intermediate image 11 to the exit pupil 15, is shown in FIG. 9.

In FIG. 8, the entrance surface 31 and exit surface 32 of the optical coupling/separating element 4 and the two surfaces of the lens, which forms the second unit 72, are all rotationally symmetric aspherical surfaces. The NA (Numerical Aperture) is 0.07, and the magnification is 1.0. In FIG. 9, the three surfaces 81, 82 and 83, which form the ocular optical system 8, are all free-form surfaces. Regarding the observation field angles, the horizontal field angle is 37 degrees, and the vertical field angle is 28 degrees. The exit pupil diameter is 4 millimeters.

Figure 10:
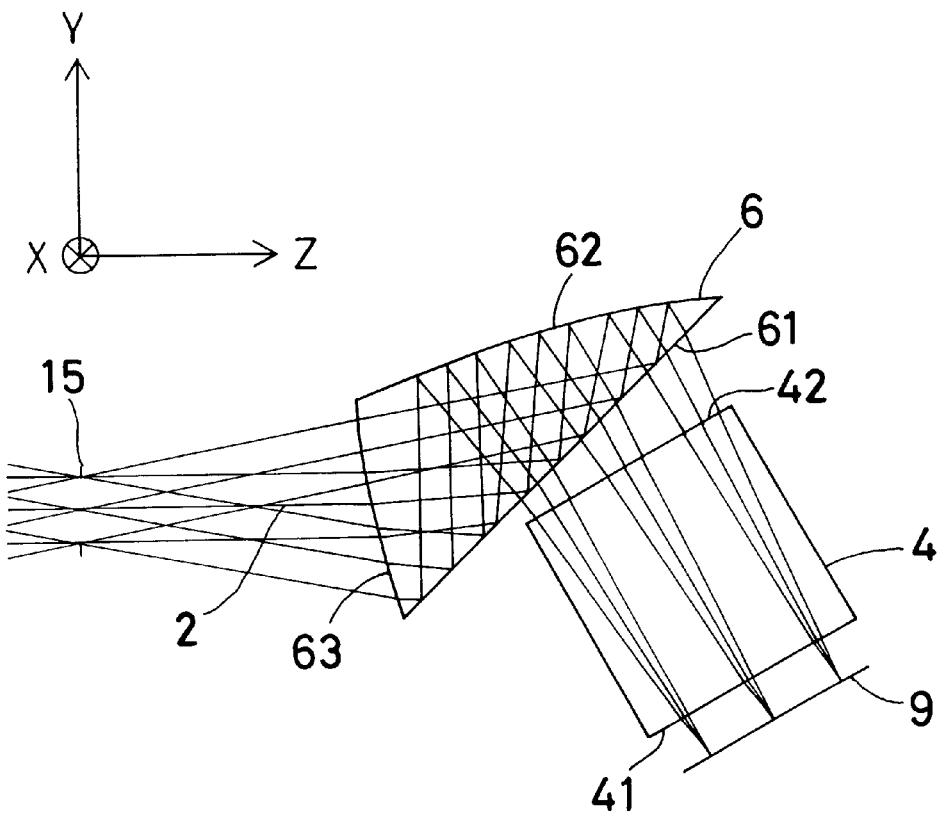
FIG. 10 is a ray path diagram showing Numerical Example 3 of the present invention.

FIG. 10 illustrates a backward ray trace in Numerical Example 3 of the present invention. This numerical example is concerned with an arrangement similar to that shown in FIG. 4. The arrangement concerned is a viewing optical system 6 extending from the image display device 9 through the optical coupling/separating element 4, which is a rectangular prism, to the exit pupil 15. The viewing optical system 6 is a decentered prism having three free-form surfaces 61, 62 and 63 decentered with respect to an optical axis. A space formed between the three surfaces 61 to 63 is filled with an optical plastic material having a refractive index of approximately 1.5. Regarding the observation field angles, the horizontal field angle is 22.8 degrees, and the vertical field angle is 30 degrees. The exit pupil diameter is 4 millimeters. The second image display device 9b differs from the first image display device 9a only in that light therefrom is reflected at 45 degrees by an optical coupling/separating element 40' (not shown) placed in the optical coupling/separating element 4. Thus, the two image display devices 9a and 9b are optically identical with each other. Therefore, an illustration of the second image display device 9b is omitted.

It should be noted that in the viewing optical system 6, light from the image display device 9 passes through the optical coupling/separating element 4 and enters the viewing optical system 6 through the first surface 61. The incident light is internally reflected by the second surface 62 and impinges on the first surface 61. At this time, the light is totally reflected at an area of the first surface 61 where the angle of reflection is set not smaller than the critical angle. At an area of the first surface 61 where the reflection angle is smaller than the critical angle, the light is internally reflected by a surface coated with a reflective coating material of high reflectivity, e.g. aluminum. The light internally reflected by the first surface 61 exits from the viewing optical system 6 while being refracted through the third surface 63. Then, the light enters an observer's eyeball placed at the position of the exit pupil 15 and forms the superimposed images of the image display devices 9a and 9b on the retina as an enlarged virtual image.

Figure 11A:
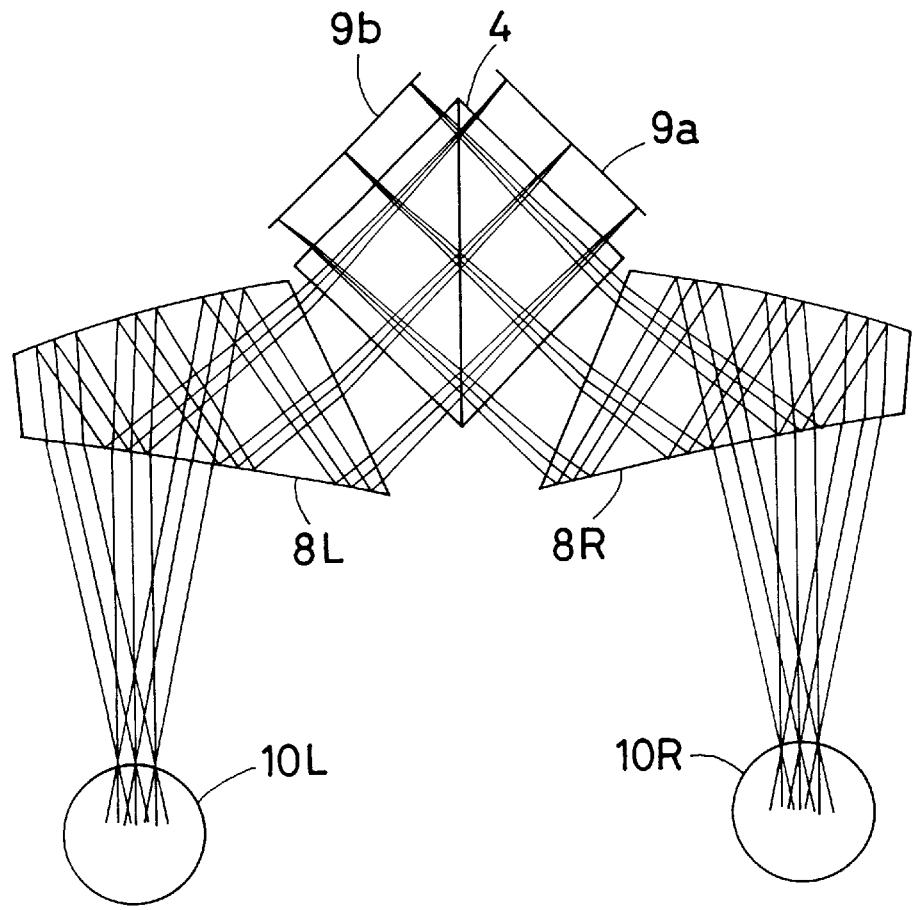
FIGS. 11(a) and 11(b) are ray path diagram showing Numerical Example 4 of the present invention.
Figure 11B:
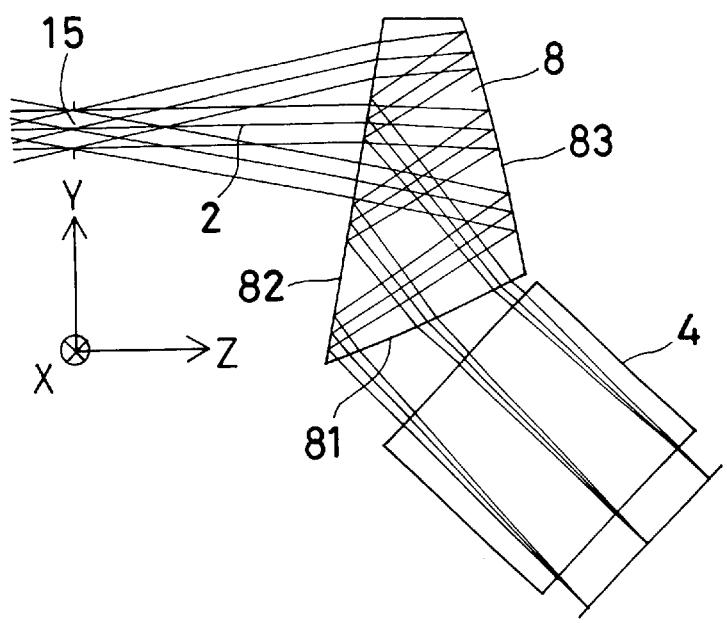

Part (a) of FIG. 11 illustrates an optical ray trace in Numerical Example 4 of the present invention. This is a numerical example of the image display apparatus shown in FIG. 5. The numerical example is concerned with an ocular optical system 8 extending from the image display devices 9a and 9b through the optical coupling/separating element 4 to the observer's eyeballs 10R and 10L. Regarding the observation field angles, the horizontal field angle is 30 degrees, and the vertical field angle is 22.8 degrees. The exit pupil diameter is 4 millimeters. In constituent parameters (described later), only data concerning a ray path in backward ray tracing from the observer's eyeball 10L (exit pupil 15) through the ocular optical system 8L and the optical coupling/separating element 4 to the image display device 9a is shown as illustrated in part (b) of FIG. 11.

Figure 12:
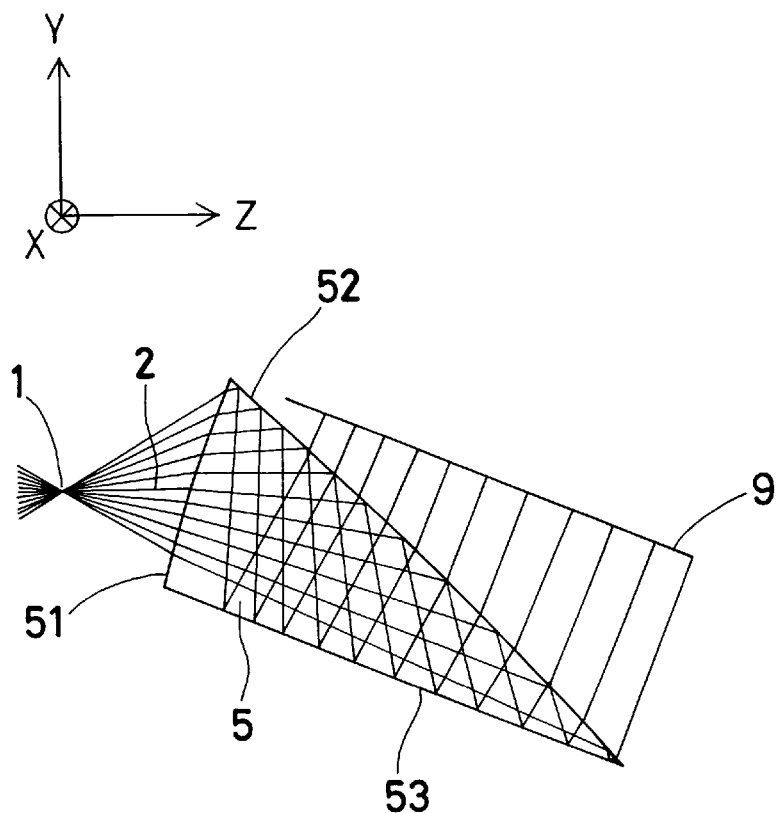
FIG. 12 is a ray path diagram showing Numerical Example 5 of the present invention.
Figure 13:
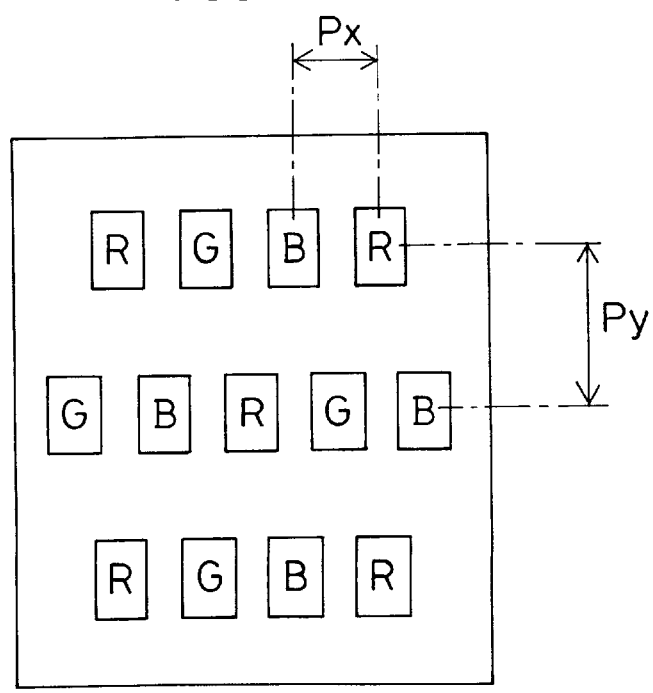
FIG. 13 is a diagram showing one example of a pixel array on an image display device used in the present invention.
Figure 14:
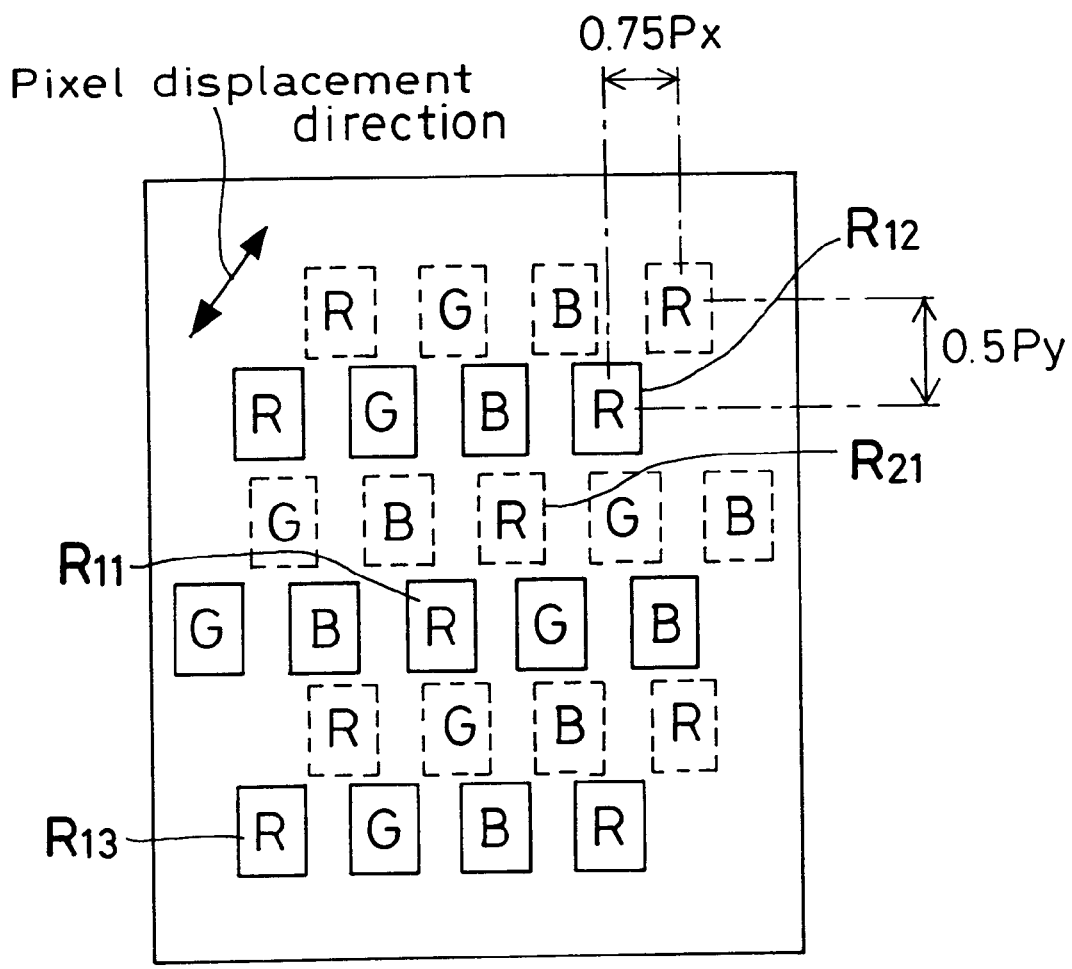
FIG. 14 is a diagram showing one example of an arrangement according to the present invention in which pixels of two image display devices are displaced relative to each other.
Figure 15:
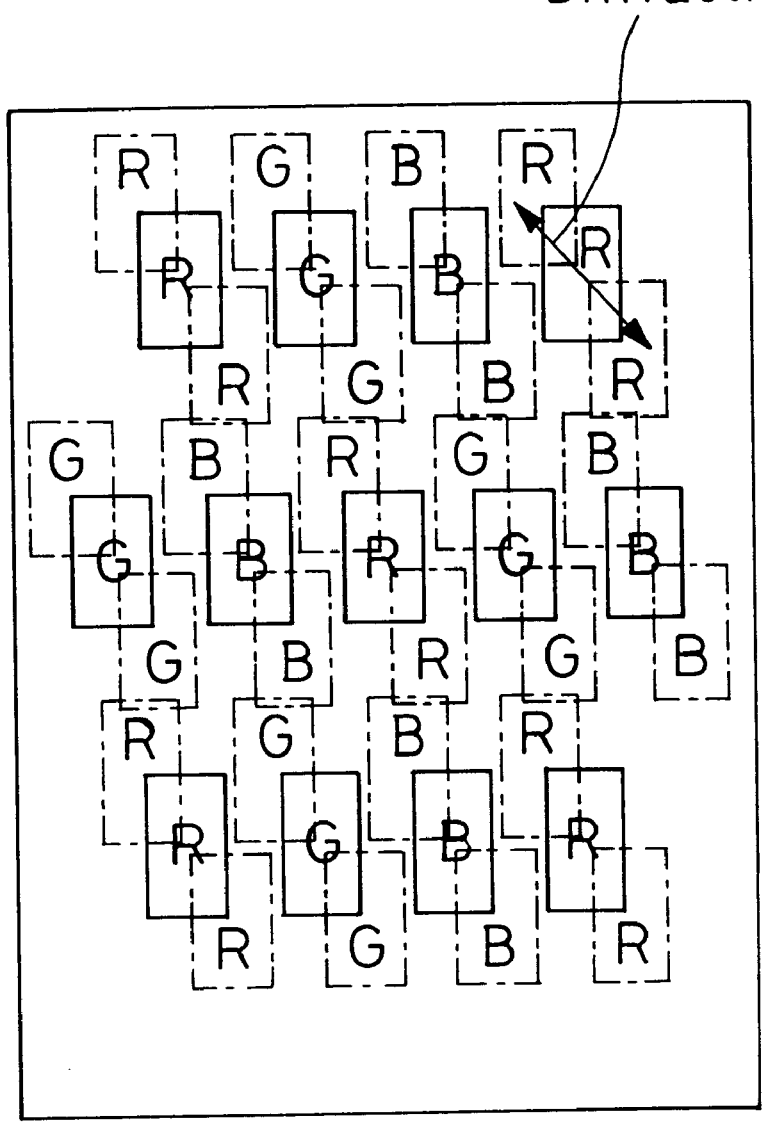
FIG. 15 is a diagram showing one example of an arrangement according to the present invention in which pixels are separated by a one-dimensional diffraction grating.

A numerical example of the illuminating optical system 5 (5a and 5b) according to the present invention that is shown in FIGS. 1, 3, 4 and 5 is given as Numerical Example 5. A forward ray trace of this numerical example is illustrated in FIG. 12. The illuminating optical system 5 has a first surface 51 through which light emitted from a light source 1 enters the optical system 5, a second surface 52, which is a surface facing opposite to the first surface 51 and having both reflecting and transmitting actions, and a third surface 53, which is a reflecting surface. A space formed between the three surfaces 51 to 53 is filled with an optical plastic material that is a substantially transparent optical medium having a refractive index of approximately 1.5. The ray path is as follows. Light from the light source 1 enters the illuminating optical system 5 through the first surface 51, which is a transmitting surface facing opposite to the light source 1 and decentered with respect to the optical axis 2. The incident light is internally reflected by the second surface 52. The light is totally reflected at an area of the second surface 52 where the angle of reflection is not smaller than the critical angle. Therefore, this area need not be coated with a reflective coating material. As will be clear from FIG. 12, the second surface 52 serves also as a surface through which light exits from the illuminating optical system 5. Therefore, in an area of the second surface 52 through which light exits, the second surface 52 is designed so as to satisfy the condition for total reflection. At an area of the second surface 52 where the reflection angle is smaller than the critical angle, the light is internally reflected by a surface coated with a reflective coating material of high reflectivity, e.g. aluminum. Further, the light is internally reflected by the third surface 53 and exits from the illuminating optical system 5 through the transmitting area of the second surface 52 to illuminate an area corresponding to the image display device 9 (9a or 9b). The NA (Numerical Aperture) on the light source side of the optical system is 0.5.

In constituent parameters of each numerical example (described later), coordinate systems used in FIGS. 7 to 12 are defined as follows.

In FIGS. 9, 10 and part (b) of FIG. 11, the exit pupil 15 of the optical system is defined as the origin of the optical system. The optical axis 2 is defined by a light ray passing through both the center of the display area of the image display device 9 (intermediate image 11) and the center (origin) of the exit pupil 15. A Z-axis is taken in the direction in which the light ray travels from the exit pupil 15 along the optical axis 2. A Y-axis is taken in the direction extending through the center of the exit pupil 15 at right angles to the Z-axis in a plane in which light rays are bent by the viewing optical system 6 or the ocular optical system 8. An X-axis is taken in the direction extending through the center of the exit pupil 15 at right angles to both the Z- and Y-axes. The direction in which the Z-axis extends from the exit pupil 15 toward the viewing optical system 6 or the ocular optical system 8 is defined as a positive direction of the Z-axis. The direction in which the Y-axis extends from the optical axis 2 toward the intermediate image 11 (FIG. 9) or away from the image display device 9 [FIG. 10 and part (b) of FIG. 11] is defined as a positive direction of the Y-axis. The direction in which the X-axis constitutes a right-handed system in combination with the Z- and Y-axes is defined as a positive direction of the X-axis. In FIGS. 8 and 12, the center of the display area of the image display device 9 or the center of the light source 1 is defined as the origin of the optical system. The optical axis 2 is defined by a light ray passing through the center of the intermediate image 11 or a light ray passing through both the center of the display area of the image display device 9 and the center (origin) of the exit pupil 15. X-, Y- and Z-axes are defined in the same way as the above. It should be noted that ray tracing is carried out as follows. In FIGS. 7, 9, 10 and part (b) of FIG. 11, ray tracing is backward ray tracing in which light rays are traced from the exit pupil 15, which is defined as an object side, toward the image display device 9, which is defined as an image side. In FIGS. 8 and 12, ray tracing is forward ray tracing in which light rays are traced from the image display device 9 or the light source 1, which is defined as an object side, toward the intermediate image 11 or the image display device 9, which is defined as an image side.

Regarding decentered surfaces, each surface is given displacements in the X-, Y- and Z-axis directions of the vertex position of the surface from the origin of the coordinate system, and tilt angles [α, β, and γ (°)] of the center axis of the surface [in regard to a free-form surface, the Z-axis of the following equation (a)] with respect to the X-, Y- and Z-axes. In this case, positive α and β mean counterclockwise rotation relative to the positive directions of the corresponding axes, and positive γ means clockwise rotation relative to the positive direction of the Z-axis. In addition, the radius of curvature of each of spherical surfaces and rotationally symmetric aspherical surfaces, and refractive index of each medium, together with Abbe's number, are given according to the conventional method. Regarding a coaxial portion, the position of each surface is specified by the surface separation between surfaces irrespective of the coordinate system.

It should be noted that the configuration of a free-form surface, which is a rotationally asymmetric surface, is defined by the following equation. The Z-axis of the defining equation is the axis of the rotationally asymmetric surface.

$$Z = C_2 \quad (a)$$
$$+ C_3 Y + C_4 X$$
$$+ C_5 Y^2 + C_6 YX + C_7 X^2$$
$$+ C_8 Y^3 + C_9 Y^2 X + C_{10} YX^2 + C_{11} X^3$$
$$+ C_{12} Y^4 + C_{13} Y^3 X + C_{14} Y^2 X^2 + C_{15} YX^3 + C_{16} X^4$$
$$+ C_{17} Y^5 + C_{18} Y^4 X +$$
$$\quad C_{19} Y^3 X^2 + C_{20} Y^2 X^3 + C_{21} YX^4 + C_{22} X^5$$
$$+ C_{23} Y^6 + C_{24} Y^5 X + C_{25} Y^4 X^2 + C_{26} Y^3 X^3 +$$
$$\quad C_{27} Y^2 X^4 + C_{28} YX^5 + C_{29} X^6$$
$$+ C_{30} Y^7 + C_{31} Y^6 X + C_{32} Y^5 X^2 + C_{33} Y^4 X^3 +$$
$$\quad C_{34} Y^3 X^4 + C_{35} Y^2 X^5 + C_{36} YX^6 + C_{37} X^7$$

In the above equation (a), the coefficients $C_4$, $C_6$, $C_9$ ... of the terms with odd-numbered powers of X are set equal to zero (see numerical examples described later). It should be noted that coefficients concerning aspherical surfaces which are not shown in the constituent parameters (shown later) are zero.

Free-form surfaces usable in the present invention are not necessarily limited to those defined by the above equation. It is possible to use any free-form surface that can be arranged as a surface having no plane of symmetry in the surface nor out of the surface or as a surface having one plane of symmetry in the surface and also out of the surface.

The configuration of a rotationally symmetric aspherical surface is defined by the following equation. The Z-axis of the defining equation is the axis of the rotationally symmetric surface.

$$Z = (Y^2/R)/[1+\{1-(1+K)P(Y^2/R^2)\}^{1/2}] + A_4 Y^4 + A_6 Y^6 + A_8 Y^8 + A_{10} Y^{10} \quad (b)$$

where Y is a direction perpendicular to Z; R is a paraxial curvature radius; P is a conical coefficient; and $A_4$, $A_6$, $A_8$, and $A_{10}$ are aspherical coefficients, respectively.

In constituent parameters (shown later), those terms concerning aspherical surfaces for which no data is shown are zero. The refractive index is expressed by the refractive index for the spectral d-line (wavelength: 587.56 nanometers). Lengths are given in millimeters.

Constituent parameters of the above-described Numerical Examples 1 to 5 are shown below. It should be noted that "FFS" denotes a free-form surface.

| Numerical example 1 | | | | | |
|---|---|---|---|---|---|
| Surface No. | Radius of curvature | Surface separation | Displacement and tilt | Refractive index | Abbe's No. |
| Object plane | ∞ | ∞ | | | |
| 1 | ∞ (Pupil) | 20.00 | | | |
| 2 | 12.74 | 23.00 | | 1.5254 | 56.2 |
| 3 | −28.39 | 7.41 | | | |
| Image plane | ∞ | | | | |

| Aspherical Coefficients |
|---|
| Surface No. 2 |

| | |
|---|---|
| K = | 0 |
| $A_4$ = | $1.3986 \times 10^{-5}$ |
| $A_6$ = | $-7.5087 \times 10^{-7}$ |

Surface No. 3

| | |
|---|---|
| K = | 0 |
| $A_4$ = | $3.5495 \times 10^{-4}$ |
| $A_6$ = | $-2.5515 \times 10^{-6}$ |

| Numerical example 2 (Relay optical system) | | | | | |
|---|---|---|---|---|---|
| Surface No. | Radius of curvature | Surface separation | Displacement and tilt | Refractive index | Abbe's No. |
| Object plane | ∞ | 2.12 | | | |
| 1 | 9.70 | 24.38 | | 1.5254 | 56.2 |
| 2 | −8.44 | 6.00 | | | |
| 3 | ∞ | −7.25 | (1) | | |
| 4 | −11.47 | −4.99 | | 1.6914 | 49.6 |
| 5 | 634.70 | −11.39 | | | |
| Image plane | ∞ | | | | |

| Aspherical Coefficients |
|---|
| Surface No. 1 |

| | |
|---|---|
| K = | $-8.5740 \times 10^{-1}$ |
| $A_4$ = | $-7.2354 \times 10^{-5}$ |
| $A_6$ = | $-4.0366 \times 10^{-7}$ |

Surface No. 2

| | |
|---|---|
| K = | −6.5437 |
| $A_4$ = | $-2.4067 \times 10^{-4}$ |
| $A_6$ = | $1.5677 \times 10^{-6}$ |

Surface No. 4

| | |
|---|---|
| K = | −2.9752 |
| $A_4$ = | $2.9769 \times 10^{-5}$ |
| $A_6$ = | $-1.0828 \times 10^{-7}$ |

|   |   |
|---|---|
| $A_8 =$ | $1.0167 \times 10^{-10}$ |
| $A_{10} =$ | $4.4215 \times 10^{-12}$ |

Surface No. 5

|   |   |
|---|---|
| $K =$ | $8.0449 \times 10^{2}$ |
| $A_4 =$ | $8.0968 \times 10^{-5}$ |
| $A_6 =$ | $1.0529 \times 10^{-7}$ |

Displacement and tilt (1)

| X | 0.00 | Y | 0.00 | Z | 0.00 |
|---|------|---|------|---|------|
| α | 45.00 | β | 0.00 | γ | 0.00 |

Numerical example 2 (Eyepiece optical system)

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Pupil) | | | | |
| 2 | FFS[1] | | (1) | 1.4922 | 57.5 |
| 3 | FFS[2] | | (2) | 1.4922 | 57.5 |
| 4 | FFS[1] | | (1) | 1.4922 | 57.5 |
| 5 | FFS[3] | | (3) | | |
| Image plane | ∞ | | (4) | | |

FFS[1]

| $C_5$ | $-6.2474 \times 10^{-3}$ | $C_7$ | $-5.7927 \times 10^{-3}$ | $C_8$ | $-1.4826 \times 10^{-4}$ |
| $C_{10}$ | $-2.3205 \times 10^{-5}$ | $C_{12}$ | $3.3675 \times 10^{-6}$ | $C_{14}$ | $5.0832 \times 10^{-6}$ |
| $C_{16}$ | $1.1645 \times 10^{-6}$ | $C_{17}$ | $1.2932 \times 10^{-7}$ | $C_{19}$ | $1.4322 \times 10^{-7}$ |
| $C_{21}$ | $5.3113 \times 10^{-8}$ | | | | |

FFS[2]

| $C_5$ | $-1.0023 \times 10^{-2}$ | $C_7$ | $-1.0720 \times 10^{-2}$ | $C_8$ | $-1.0941 \times 10^{-5}$ |
| $C_{10}$ | $-8.8301 \times 10^{-7}$ | $C_{12}$ | $1.0206 \times 10^{-6}$ | $C_{14}$ | $-3.4635 \times 10^{-6}$ |
| $C_{16}$ | $-1.3033 \times 10^{-6}$ | $C_{17}$ | $-1.4704 \times 10^{-7}$ | $C_{19}$ | $-8.6405 \times 10^{-8}$ |
| $C_{21}$ | $1.0514 \times 10^{-8}$ | | | | |

FFS[3]

| $C_5$ | $-3.4790 \times 10^{-2}$ | $C_7$ | $3.2951 \times 10^{-3}$ | $C_8$ | $-6.2877 \times 10^{-4}$ |
| $C_{10}$ | $1.2937 \times 10^{-3}$ | $C_{12}$ | $3.3287 \times 10^{-4}$ | $C_{14}$ | $3.1972 \times 10^{-4}$ |
| $C_{16}$ | $-3.7090 \times 10^{-5}$ | $C_{17}$ | $-4.4324 \times 10^{-6}$ | $C_{19}$ | $-7.3829 \times 10^{-6}$ |
| $C_{21}$ | $1.4800 \times 10^{-7}$ | | | | |

Displacement and tilt (1)

| X | 0.00 | Y | 8.33 | Z | 27.68 |
|---|------|---|------|---|------|
| α | 12.79 | β | 0.00 | δ | 0.00 |

Displacement and tilt (2)

| X | 0.00 | Y | 0.44 | Z | 37.86 |
| α | -17.42 | β | 0.00 | γ | 0.00 |

Displacement and tilt (3)

| X | 0.00 | Y | 17.76 | Z | 32.42 |
| α | 71.18 | β | 0.00 | γ | 0.00 |

Displacement and tilt (4)

| X | 0.00 | Y | 21.87 | Z | 34.85 |
| α | 55.49 | β | 0.00 | γ | 0.00 |

Numerical example 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Pupil) | | | | |
| 2 | FFS[1] | | (1) | 1.4924 | 81.8 |
| 3 | FFS[2] | | (2) | 1.4924 | 81.8 |
| 4 | FFS[3] | | (3) | 1.4924 | 81.8 |
| 5 | FFS[2] | | (2) | | |
| 6 | ∞ | 15.00 | (4) | | |
| 7 | ∞ | 3.00 | | | |
| Image plane | ∞ | | | | |

FFS[1]

| $C_5$ | $9.5890 \times 10^{-3}$ | $C_7$ | $1.3070 \times 10^{-2}$ | $C_{10}$ | $-4.3122 \times 10^{-4}$ |
| $C_{12}$ | $-1.3749 \times 10^{-5}$ | $C_{14}$ | $-1.4680 \times 10^{-5}$ | $C_{16}$ | $-1.6473 \times 10^{-5}$ |

FFS[2]

| $C_5$ | $3.5335 \times 10^{-3}$ | $C_7$ | $2.6291 \times 10^{-3}$ | $C_8$ | $1.7267 \times 10^{-5}$ |
| $C_{10}$ | $-1.3802 \times 10^{-5}$ | $C_{12}$ | $1.0746 \times 10^{-6}$ | $C_{14}$ | $-1.3037 \times 10^{-6}$ |
| $C_{16}$ | $-5.8106 \times 10^{-7}$ | $C_{17}$ | $2.6951 \times 10^{-8}$ | $C_{15}$ | $2.6046 \times 10^{-8}$ |
| $C_{21}$ | $8.2150 \times 10^{-8}$ | | | | |

FFS[3]

| $C_5$ | $-5.7249 \times 10^{-3}$ | $C_7$ | $-7.5556 \times 10^{-3}$ | $C_8$ | $5.0283 \times 10^{-5}$ |
| $C_{10}$ | $7.4221 \times 10^{-5}$ | $C_{12}$ | $1.4565 \times 10^{-6}$ | $C_{14}$ | $-9.2326 \times 10^{-7}$ |
| $C_{16}$ | $8.5466 \times 10^{-8}$ | $C_{17}$ | $4.2972 \times 10^{-8}$ | $C_{19}$ | $-9.0797 \times 10^{-8}$ |
| $C_{21}$ | $1.0359 \times 10^{-7}$ | | | | |

Displacement and tilt (1)

| X | 0.00 | Y | 0.00 | Z | 18.00 |
| α | 12.67 | β | 0.00 | γ | 0.00 |

Displacement and tilt (2)

| X | 0.00 | Y | -1.81 | Z | 25.12 |
| α | -44.98 | β | 0.00 | γ | 0.00 |

Displacement and tilt (3)

| X | 0.00 | Y | 8.10 | Z | 21.17 |
| α | 110.58 | β | 0.00 | γ | 0.00 |

Displacement and tilt (4)

| X | 0.00 | Y | 2.34 | Z | 33.79 |
| α | -59.80 | β | 0.00 | γ | 0.00 |

Numerical example 4

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Pupil) | | | | |
| 2 | FFS[1] | | (1) | 1.4924 | 81.8 |
| 3 | FFS[2] | | (2) | 1.4924 | 81.8 |
| 4 | FFS[1] | | (1) | 1.4924 | 81.8 |
| 5 | FFS[3] | | (3) | | |
| 6 | ∞ | 25.00 | (4) | | |
| 7 | ∞ | 5.00 | | | |
| Image plane | ∞ | | | | |

FFS[1]

| $C_5$ | $-4.1181 \times 10^{-5}$ | $C_7$ | $-8.4183 \times 10^{-4}$ | $C_8$ | $-9.9897 \times 10^{-7}$ |
| $C_{10}$ | $-2.8884 \times 10^{-5}$ | $C_{12}$ | $-6.3209 \times 10^{-8}$ | $C_{14}$ | $-1.8957 \times 10^{-7}$ |
| $C_{16}$ | $2.2529 \times 10^{-6}$ | $C_{17}$ | $5.3781 \times 10^{-10}$ | $C_{19}$ | $1.0228 \times 10^{-8}$ |
| $C_{21}$ | $-7.3574 \times 10^{-8}$ | | | | |

FFS[2]

| $C_5$ | $3.4703 \times 10^{-3}$ | $C_7$ | $4.4191 \times 10^{-3}$ | $C_8$ | $-3.4265 \times 10^{-6}$ |
| $C_{10}$ | $4.8862 \times 10^{-7}$ | $C_{12}$ | $-4.4017 \times 10^{-8}$ | $C_{14}$ | $-6.7498 \times 10^{-7}$ |
| $C_{16}$ | $1.5056 \times 10^{-7}$ | $C_{17}$ | $-1.1085 \times 10^{-8}$ | $C_{19}$ | $1.0044 \times 10^{-9}$ |
| $C_{21}$ | $-6.0956 \times 10^{-8}$ | | | | |

FFS[3]

| $C_5$ | $1.6275 \times 10^{-4}$ | $C_7$ | $-6.7464 \times 10^{-4}$ | $C_{10}$ | $-2.0079 \times 10^{-5}$ |
| $C_{12}$ | $-5.2872 \times 10^{-6}$ | $C_{14}$ | $-1.6214 \times 10^{-6}$ | $C_{16}$ | $-4.4927 \times 10^{-5}$ |

Displacement and tilt (1)

| X | 0.00 | Y | -40.93 | Z | 26.44 |
| α | -10.96 | β | 0.00 | γ | 0.00 |

Displacement and tilt (2)

| X | 0.00 | Y | 6.24 | Z | 46.87 |
| α | -162.85 | β | 0.00 | γ | 0.00 |

-continued

| Displacement and tilt (3) | | | | | |
|---|---|---|---|---|---|
| X | 0.00 | Y | −20.94 | Z | 43.82 |
| α | −66.20 | β | 0.00 | γ | 0.00 |

| Displacement and tilt (4) | | | | | |
|---|---|---|---|---|---|
| X | 0.00 | Y | −27.01 | Z | 44.83 |
| α | −45.00 | β | 0.00 | γ | 0.00 |

Numerical example 4

| Surface No. | Radius of curvature | Surface separation | Displacement and tilt | Refractive index | Abbe's No. |
|---|---|---|---|---|---|
| Object plane | ∞ | ∞ | | | |
| 1 | 197.61 | | (1) | 1.5168 | 64.1 |
| 2 | FFS[1] | | (2) | 1.5168 | 64.1 |
| 3 | 104.09 | | (3) | 1.5168 | 64.1 |
| 4 | FFS[1] | | (2) | | |
| Image plane | ∞ | | (4) | | |

Aspherical Coefficients

Surface No. 1

$K = 0$
$A_4 = -6.3744 \times 10^{-7}$
$A_6 = -1.1700 \times 10^{-11}$
$A_8 = 1.3038 \times 10^{-14}$
$A_{10} = -5.9921 \times 10^{-19}$

FFS[1]

$C_5 = -3.3999 \times 10^{-4}$  $C_7 = -2.8566 \times 10^{-5}$  $C_8 = 2.1946 \times 10^{-5}$
$C_{10} = 7.2290 \times 10^{-5}$  $C_{12} = -3.1151 \times 10^{-8}$  $C_{14} = 2.0686 \times 10^{-7}$
$C_{18} = -1.5105 \times 10^{-6}$  $C_{17} = -2.9699 \times 10^{-9}$  $C_{19} = -5.7440 \times 10^{-9}$
$C_{21} = -3.5562 \times 10^{-8}$

| Displacement and tilt (1) | | | | | |
|---|---|---|---|---|---|
| X | 0.00 | Y | 5.55 | Z | 14.31 |
| α | −20.35 | β | 0.00 | γ | 0.00 |

| Displacement and tilt (2) | | | | | |
|---|---|---|---|---|---|
| X | 0.00 | Y | 4.80 | Z | 21.55 |
| α | 47.43 | β | 0.00 | γ | 0.00 |

| Displacement and tilt (3) | | | | | |
|---|---|---|---|---|---|
| X | 0.00 | Y | −8.28 | Z | 7.26 |
| α | 68.00 | β | 0.00 | γ | 0.00 |

| Displacement and tilt (4) | | | | | |
|---|---|---|---|---|---|
| X | 0.00 | Y | 0.37 | Z | 40.34 |
| α | 67.91 | β | 0.00 | γ | 0.00 |

Although in the foregoing examples rotationally asymmetric aspherical surfaces are formed from free-form surfaces defined by the above-described equation (a), it is possible to use curved surfaces defined by any equation.

Figure 17:
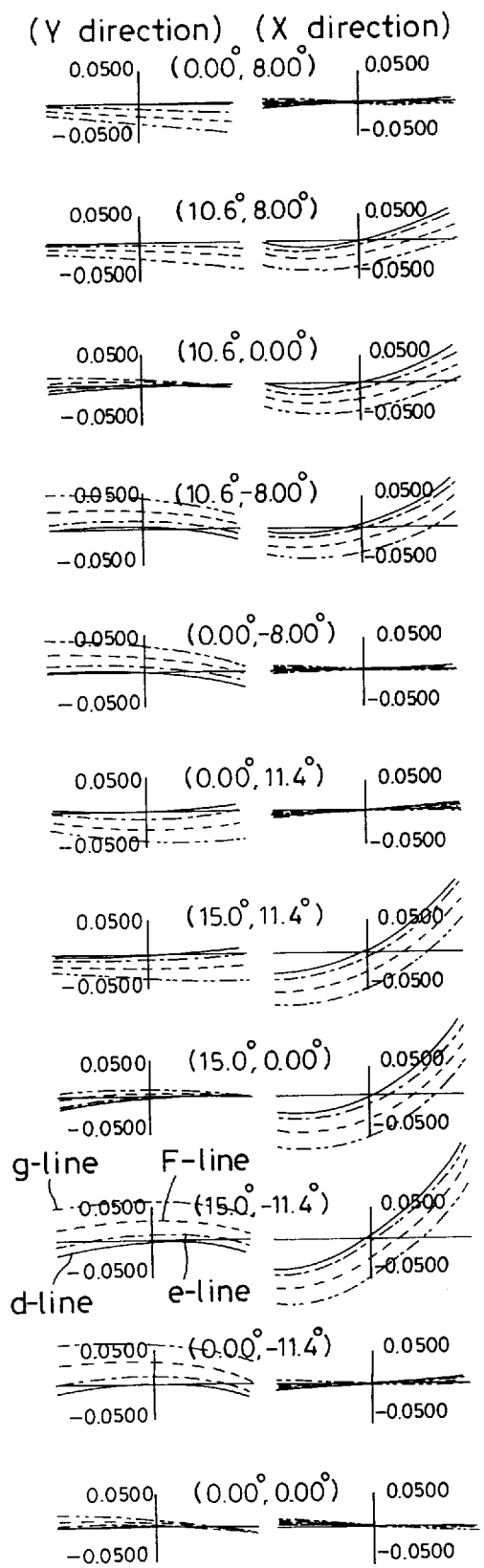
FIG. 17 is an aberrational diagram illustrating lateral aberrations in Numerical Example 3.

FIG. 17 graphically shows lateral aberrations in Numerical Example 3 (FIG. 10). In the diagram showing lateral aberrations, numerals in each pair of parentheses express a field angle in the X-direction and a field angle in the Y-direction, respectively, and lateral aberrations at the field angles are shown.

It should be noted that decentered prisms used as the viewing optical system 6, the ocular optical system 8 or the illuminating optical system 5 are not necessarily limited to those shown in FIGS. 1, 3 to 6, and 9 to 12. For example, decentered prisms such as those shown in FIGS. 18 to 25 are also usable. Although the decentered prisms shown in FIGS. 18 to 25 are each described as the viewing optical system 6, when they are used as the illuminating optical system 5, the image display device 9 is placed at the position of the exit pupil 15, and the light source 1 is placed at the position of the image display device 9. It should be noted that when the decentered prisms are used as the ocular optical system 8, the arrangement is the same as that in the case of the viewing optical system 6. In this case, however, the intermediate image 11 lies at the position of the image display device 9. The optical systems 6 shown in FIGS. 18 to 25 will be briefly described below.

Figure 18:
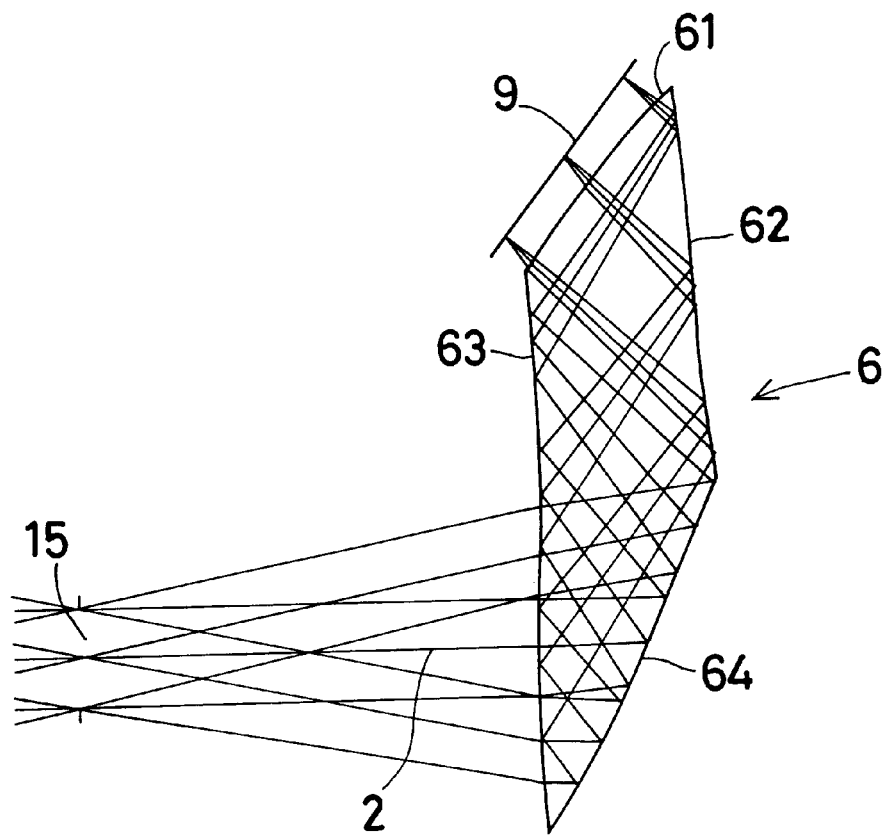
FIG. 18 is a ray path diagram showing another example of a decentered prism usable as a viewing optical system, an ocular optical system or an illuminating optical system in the present invention.

The decentered prism 6 shown in FIG. 18 has four surfaces 61 to 64 decentered with respect to the optical axis 2. A space formed between the four surfaces 61 to 64 is filled with an optically transparent medium having a refractive index larger than 1. Let us assume that an entrance surface through which light emanating from the image display device 9 enters the decentered prism 6 is a first surface 61, a reflecting surface on a side of the decentered prism remote from the exit pupil 15 is a fourth surface 64, a surface close to the exit pupil 15 is a third surface 63, and a reflecting surface lying between the first surface 61 and the fourth surface 64 and facing the third surface 63 is a second surface 62. Light rays emanating from the image display device 9 enter the decentered prism 6 while being refracted through the first surface 61 and are internally reflected by the second surface 62 toward the third surface 63. The reflected rays are internally reflected from the third surface 63 toward the fourth surface 64 and further internally reflected from the fourth surface 64 toward the third surface 63. Then, the rays exit from the decentered prism 6 while being refracted through the third surface 63, and reach the exit pupil 15. The third surface 63 is a totally reflecting surface.

Figure 19:
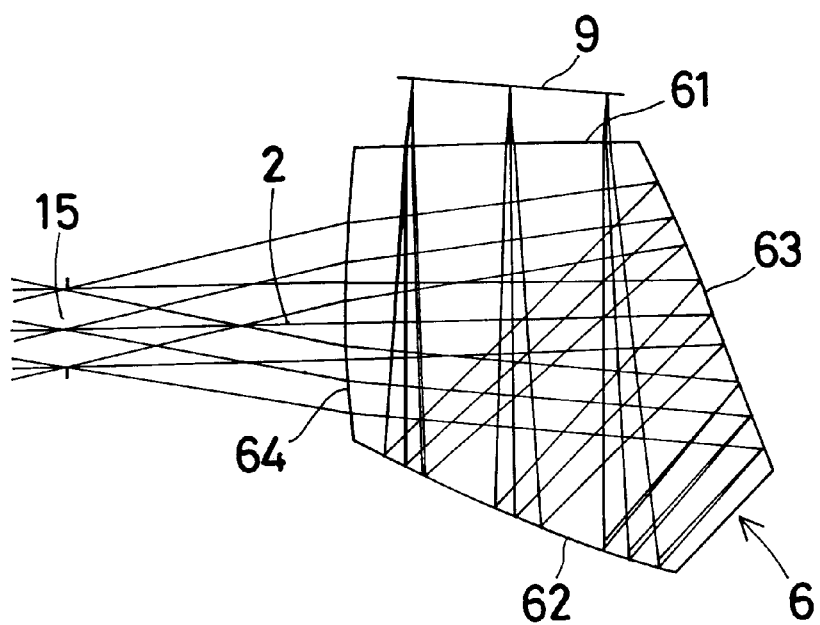
FIG. 19 is a ray path diagram showing another example of a similar decentered prism.

The decentered prism 6 shown in FIG. 19 has four optical surfaces 61 to 64. A space formed between the four surfaces 61 to 64 is filled with a medium having a refractive index larger than 1. Display light from the image display device 9 enters the decentered prism 6 through a first surface 61, which is a transmitting surface placed to face opposite to the image display device 9. The incident light is reflected by a second surface 62, which is a decentered reflecting surface. The reflected light is further reflected by a third surface 63, which is a decentered reflecting surface facing opposite to the exit pupil 15. The light reflected by the third surface 63 crosses the light incident on the second surface 62 and exits from the decentered prism 6 through a fourth surface 64, which is a transmitting surface placed on the optical axis 2 between the third surface 63 and the exit pupil 15. Then, the light reaches the exit pupil 15.

Figure 20:
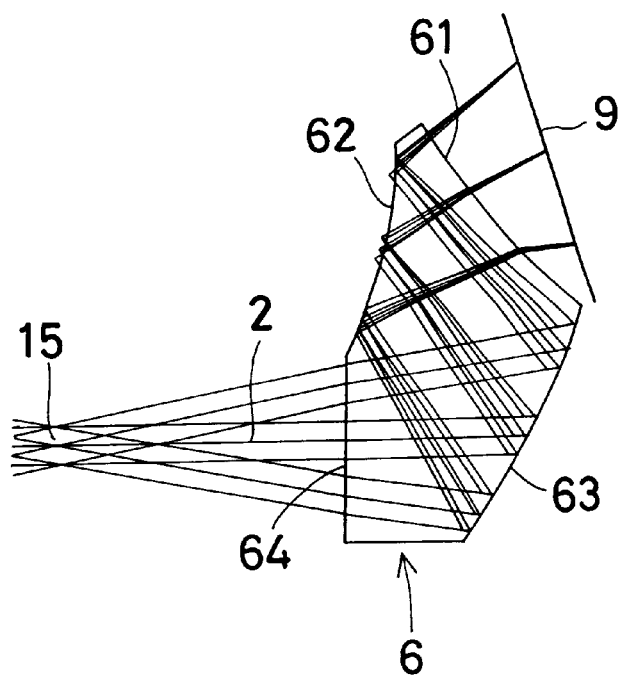
FIG. 20 is a ray path diagram showing another example of a similar decentered prism.

The decentered prism 6 shown in FIG. 20 has four optical surfaces 61 to 64. A space formed between the four surfaces 61 to 64 is filled with a medium having a refractive index larger than 1. Display light from the image display device 9 enters the decentered prism 6 through a first surface 61, which is a transmitting surface placed to face opposite to the image display device 9. The incident light is reflected by a second surface 62, which is a decentered reflecting surface. The reflected light is further reflected by a third surface 63, which is a decentered reflecting surface facing opposite to the exit pupil 15. The light reflected by the third surface 63 exits from the decentered prism 6 through a fourth surface 64, which is a transmitting surface placed between the third surface 63 and the exit pupil 15, and then reaches the exit pupil 15.

Figure 21:
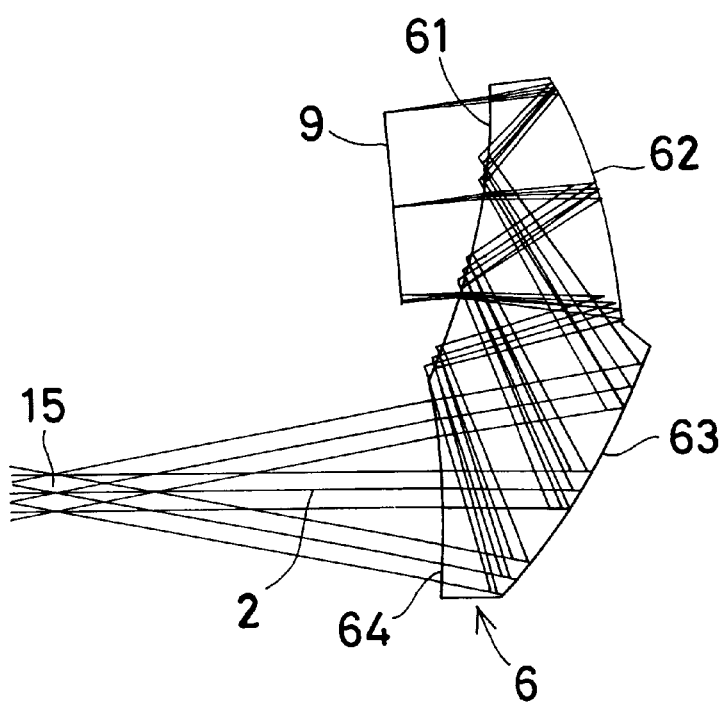
FIG. 21 is a ray path diagram showing another example of a similar decentered prism.

The decentered prism 6 shown in FIG. 21 has four optical surfaces 61 to 64. A space formed between the four surfaces 61 to 64 is filled with a medium having a refractive index larger than 1. Display light from the image display device 9 enters the decentered prism 6 through a first surface 61, which is placed to face opposite to the image display device 9 and serves as both transmitting and reflecting surfaces. The incident light is reflected by a second surface 62, which is a decentered reflecting surface. The reflected light is reflected by the first surface 61 and further reflected by a third surface 63, which is a decentered reflecting surface facing opposite to the exit pupil 15. The light reflected by the third surface 63 exits from the decentered prism 6 through a fourth surface 64, which is a transmitting surface placed between the third surface 63 and the exit pupil 15, and then reaches the exit pupil 15.

Figure 22:
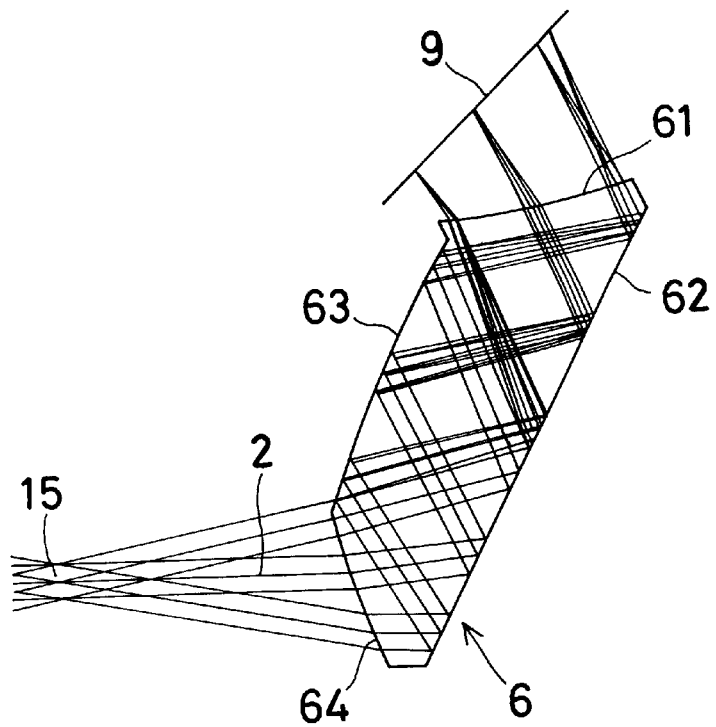
FIG. 22 is a ray path diagram showing another example of a similar decentered prism.

The decentered prism 6 shown in FIG. 22 has four optical surfaces 61 to 64. A space formed between the four surfaces 61 to 64 is filled with a medium having a refractive index larger than 1. Display light from the image display device 9 enters the decentered prism 6 through a first surface 61, which is a transmitting surface placed to face opposite to the image display device 9. The incident light is reflected by a second surface 62, which is a decentered reflecting surface facing opposite to the exit pupil 15. The reflected light is reflected by a third surface 63, which is a reflecting surface. The light reflected by the third surface 63 is reflected by the second surface 62 and exits from the decentered prism 6 through a fourth surface 64, which is a transmitting surface placed between the second surface 62 and the exit pupil 15, and then reaches the exit pupil 15.

Figure 23:
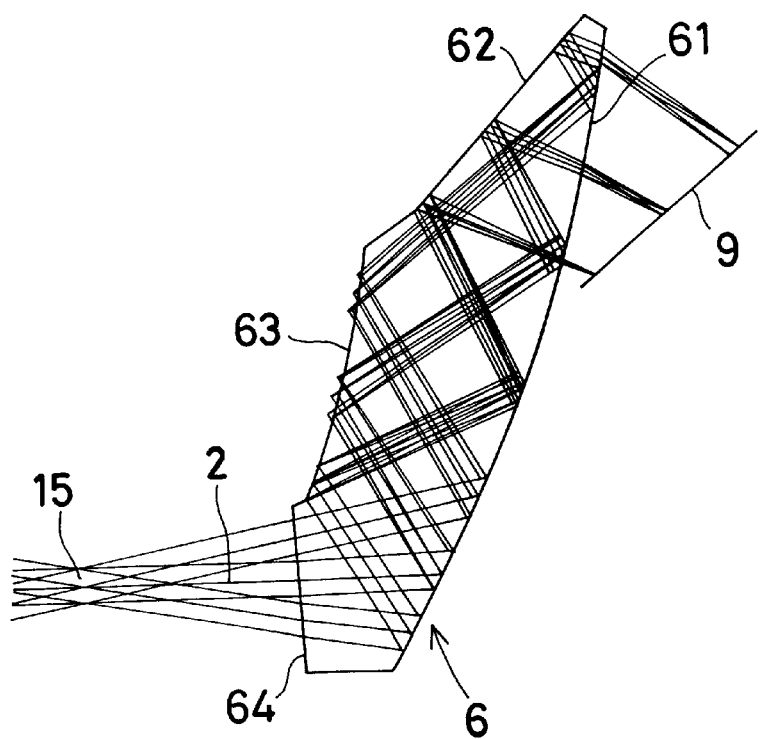
FIG. 23 is a ray path diagram showing another example of a similar decentered prism.

The decentered prism 6 shown in FIG. 23 has four optical surfaces 61 to 64. A space formed between the four surfaces 61 to 64 is filled with a medium having a refractive index larger than 1. Display light from the image display device 9 enters the decentered prism 6 through a first surface 61, which is placed to face opposite to the image display device 9 and serves as both transmitting and reflecting surfaces. The incident light is reflected by a second surface 62, which is a reflecting surface, and further reflected by the first surface 61. Then, the reflected light is reflected by a third surface 63, which is a reflecting surface, and further reflected by the first surface 61. The reflected light exits from the decentered prism 6 through a fourth surface 64, which is a transmitting surface placed between the first surface 61 and the exit pupil 15, and then reaches the exit pupil 15.

Figure 24:
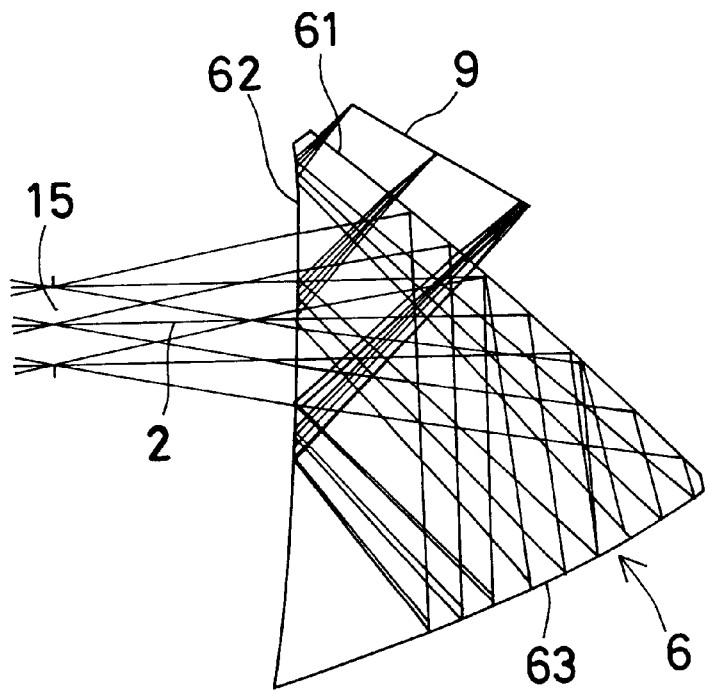
FIG. 24 is a ray path diagram showing another example of a similar decentered prism.

The decentered prism 6 shown in FIG. 24 has three optical surfaces 61 to 63. A space formed between the three surfaces 61 to 63 is filled with a medium having a refractive index larger than 1. Display light from the image display device 9 enters the decentered prism 6 through a first surface 61, which is disposed to face opposite to the image display device 9 and serves as both transmitting and reflecting surfaces. The incident light is reflected by a second surface 62, which serves as both reflecting and transmitting surfaces. Then, the reflected light is reflected by a third surface 63, which is a reflecting surface, and further reflected by the first surface 61. The reflected light crosses the light reflected by the second surface 62 and exits from the decentered prism 6 through the second surface 62. Then, the light reaches the exit pupil 15.

Figure 25:
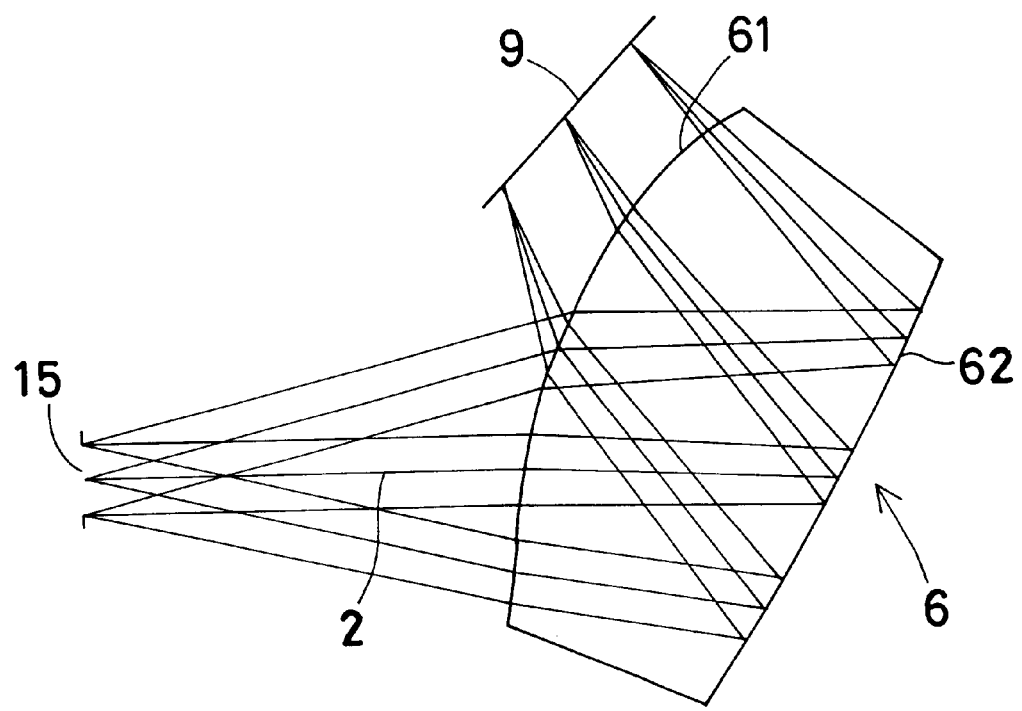
FIG. 25 is a ray path diagram showing another example of a similar decentered prism.

The decentered prism 6 shown in FIG. 25 has two optical surfaces 61 and 62. A space formed between the two surfaces 61 and 62 is filled with a medium having a refractive index larger than 1. Display light from the image display device 9 enters the decentered prism 6 through a first surface 61, which is disposed to face opposite to the image display device 9 and serves as both entrance and exit surfaces. The incident light is reflected by a second surface 62, which is a decentered reflecting surface. The light reflected by the second surface 62 exits from the decentered prism 6 through the first surface 61 and reaches the exit pupil 15.

It should be noted that all the above-described decentered prisms 6 project light from the image display devices 9a and 9b into the observer's eyeball at the position of the exit pupil 15 without forming an intermediate image and form the superimposed images of the image display devices 9a and 9b on the retina of the observer's eyeball.

The image display apparatus according to the present invention may be applied to a head-mounted image display apparatus as follows. A head-mounted image display apparatus for a single eye can be formed by preparing one set of image display apparatus arranged as stated above. It is also possible to form a head-mounted image display apparatus for two eyes. In the case of the image display apparatus according to the first aspect of the present invention, a head-mounted image display apparatus is formed by preparing a pair of such image display apparatuses for observer's left and right eyes and supporting them apart from each other by the interpupillary distance, i.e. the distance between the two eyes. In the case of the image display apparatus according to the second aspect of the present invention, a head-mounted image display apparatus is formed by supporting the image display apparatus as it is. Thus, it is possible to form a stationary or portable image display apparatus that enables observation with a single eye or two eyes.

Figure 26:
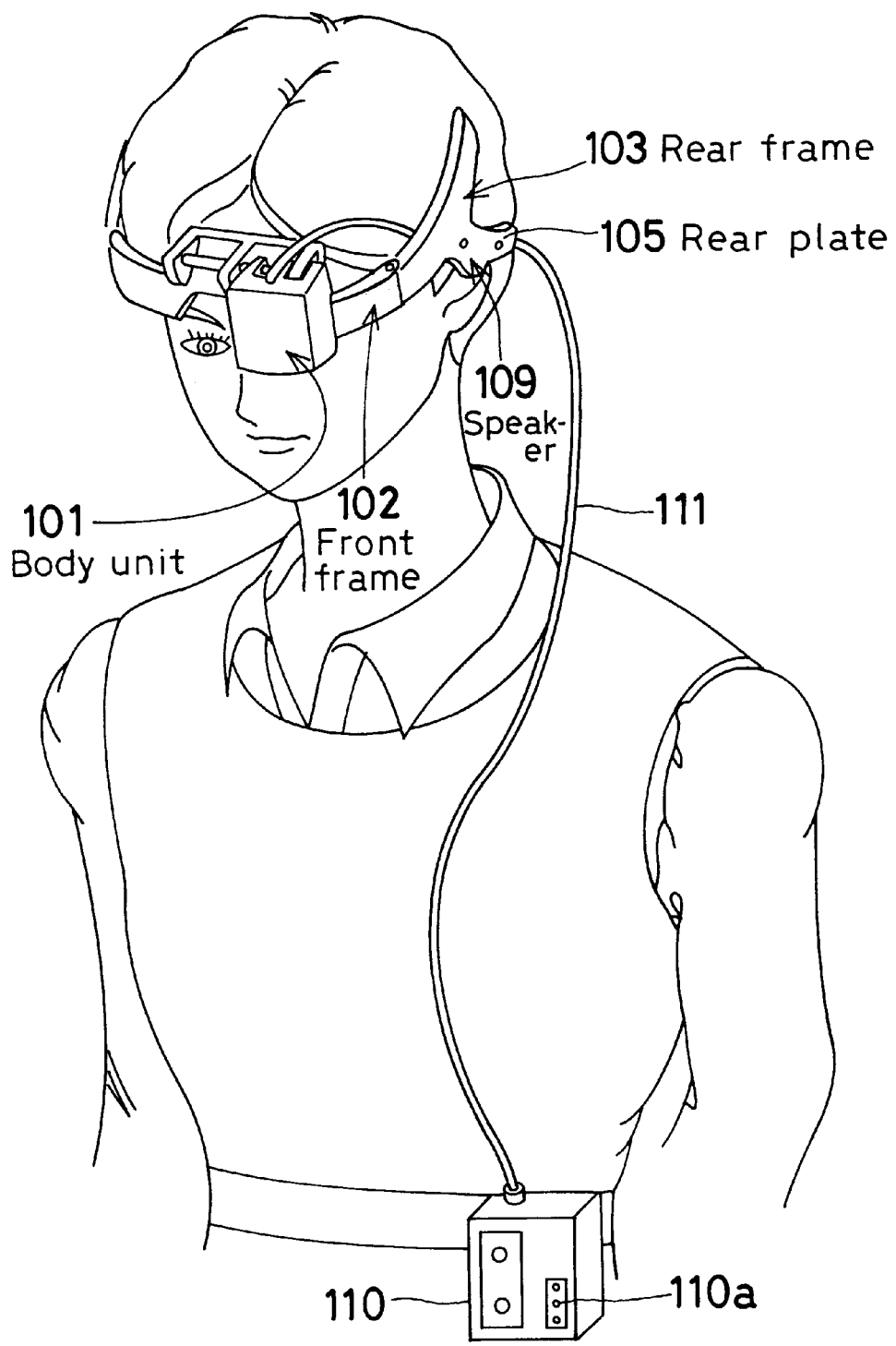
FIG. 26 is a diagram showing an image display apparatus according to the present invention as adapted to be fitted for a single eye of an observer.
Figure 27:
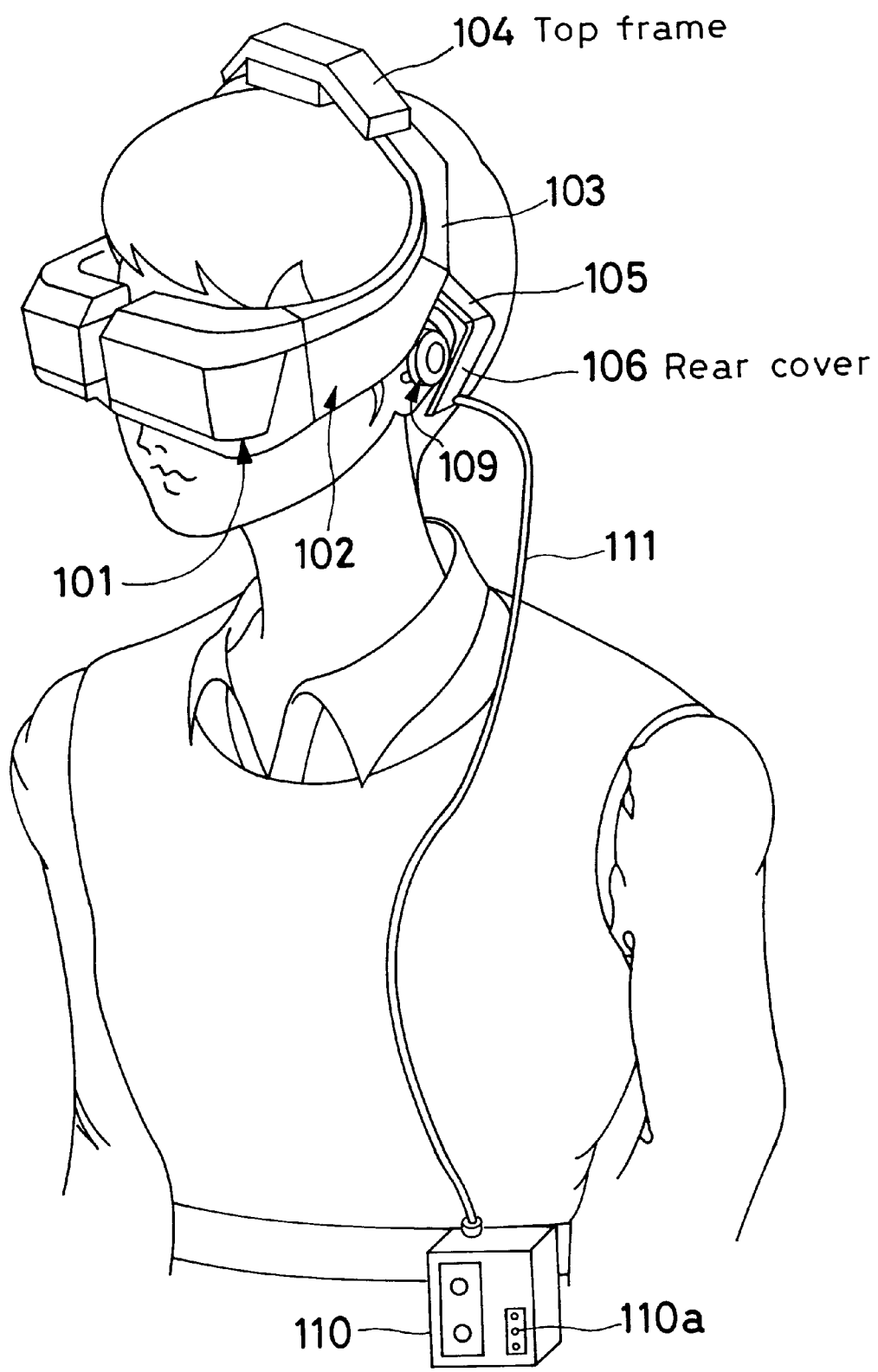
FIG. 27 is a diagram showing an image display apparatus according to the present invention as adapted to be fitted for both eyes of an observer.
Figure 28:
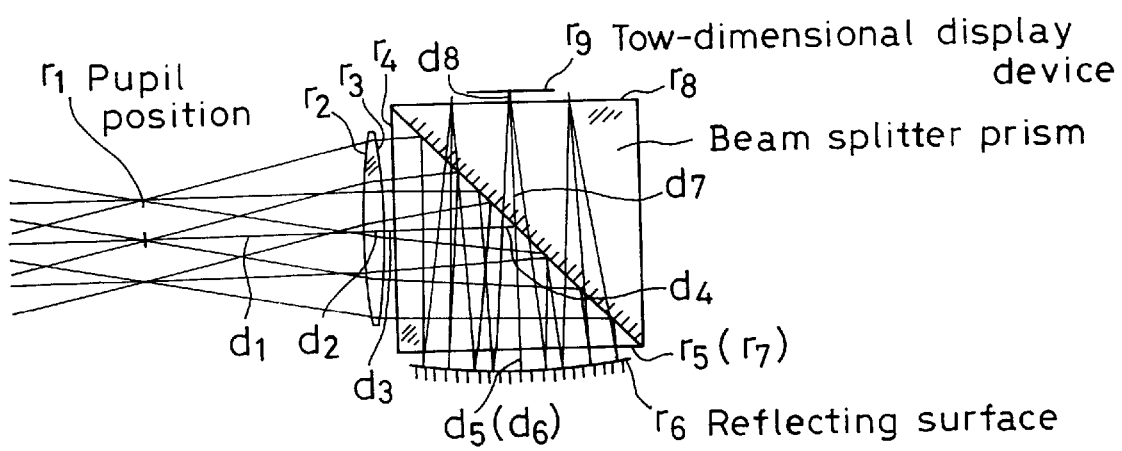
FIG. 28 is a diagram showing a conventional image display apparatus.

FIG. 26 shows a head-mounted image display apparatus arranged for a single eye (in this case, the apparatus is designed for the left eye), and FIG. 27 shows a head-mounted image display apparatus arranged for two eyes. In FIGS. 26 and 27, reference numeral 101 denotes a display apparatus body unit. In the case of FIG. 26, the display apparatus body unit 101 is supported by a support member through the observer's head such that the display apparatus body unit 101 is held in front of the observer's left eye. In the case of FIG. 27, the display apparatus body unit 101 is supported by a support member through the observer's head such that the display apparatus body unit 101 is held in front of both the observer's eyes. The support member has a pair of front frames 102 (left and right) each joined at one end thereof to the display apparatus body unit 101. The left and right front frames 102 extend from the observer's temples to the upper portions of his/her ears, respectively. A pair of rear frames 103 (left and right) are joined to the other ends of the left and right front frames 102, respectively, and extend over the left and right side portions of the observer's head. In the case of FIG. 27, the support member further has a top frame 104 joined at both ends thereof to the other ends of the left and right rear frames 103, respectively, such that the top frame 104 lies over the top of the observer's head.

A rear plate 105 is joined to one front frame 102 near the joint to the rear frame 103. The rear plate 105 is formed from an elastic member, e.g. a metal leaf spring. In the case of FIG. 27, a rear cover 106, which constitutes a part of the support member, is joined to the rear plate 105 such that the rear cover 106 can support the apparatus at a position behind the observer's ear in a region extending from the back part of the head to the base of the neck. A speaker 109 is mounted inside the rear plate 105 or the rear cover 106 at a position corresponding to the observer's ear.

A cable 111 for transmitting external image and sound signals is led out from the display apparatus body unit 101. In the case of FIG. 27, the cable 111 extends through the top frame 104, the rear frames 103, the front frames 102 and the rear plate 105 and projects to the outside from the rear end of the rear cover 106. In the case of FIG. 26, the cable 111 projects from the rear end of the rear plate 105. The cable 111 is connected to a video-replaying unit 110. It should be noted that reference numeral 110a in the figures denotes a switch and volume control part of the video-replaying unit 110.

The cable 111 may have a jack and plug arrangement attached to the distal end thereof so that the cable 111 can be detachably connected to an existing video deck or the like. The cable 111 may also be connected to a TV signal receiving tuner so as to enable the user to enjoy watching TV. Alternatively, the cable 111 may be connected to a computer to receive computer graphic images or message images or the like from the computer. To eliminate the bothersome cord, the head-mounted image display apparatus may be arranged to receive external radio signals through an antenna connected thereto.

As will be clear from the foregoing description, it is possible according to the present invention to provide an image display apparatus that presents an observer an image of higher resolution than the original resolution of an image display device used, despite a relatively low-cost arrangement, thereby allowing the observer to view a clear and beautiful image.

What is claimed is:

1. An image display apparatus comprising:
   a light source that emits illuminating light;
   two image display devices;
   an illuminating optical system that illuminates one of said two image display devices with said illuminating light;
   a viewing optical system that leads said image to an eyeball of an observer and;
   an optical coupling element having a light-coupling action provided between said two image display devices on the one hand and the eyeball of said observer on the other to superimpose images of said two image display devices on one another,
   wherein said image display device displays an image by transmission or reflection of said illuminating light;
   wherein said optical coupling element has an optical coupling surface tilted at an angle of approximately 45 degrees with respect to each of said two image display devices;
   wherein said viewing optical system projects said images superimposed on one another into one eyeball of said observer as an enlarged virtual image; and
   wherein at least one surface of said viewing optical system is an aspherical surface decentered with respect to an optical axis.

2. An image display apparatus according to claim 1, wherein said optical coupling surface is a polarizing half-mirror.

3. An image display apparatus according to claim 1, wherein at least one surface of said viewing optical system is a rotationally asymmetric aspherical surface decentered with respect to an optical axis.

4. An image display apparatus according to claim 3, wherein said viewing optical system is a decentered prism member in which a space formed between at least two surfaces is filled with a medium having a refractive index larger than 1.

5. An image display apparatus comprising:
   a light source that emits illuminating light;
   two image display devices;
   an illuminating optical system that illuminates one of said two image display devices with said illuminating light;
   a viewing optical system that leads said image to an eyeball of an observer and;
   an optical coupling element having a light-coupling action provided between said two image display devices on the one hand and the eyeball of said observer on the other to superimpose images of said two image display devices on one another and direct said images superimposed on one another in two directions,
   wherein said image display device displays an image by transmission or reflection of said illuminating light;
   wherein said optical coupling element has an optical coupling surface tilted at an angle of approximately 45 degrees with respect to each of said two image display devices;
   wherein said viewing optical system includes two viewing optical systems to project said images superimposed on one another into left and right eyes of said observer as enlarged virtual images; and
   wherein at least one surface of said viewing optical system is an aspherical surface decentered with respect to an optical axis.

6. An image display apparatus comprising:
   a light source that emits illuminating light;
   a first and second image display devices;
   an illuminating optical system that illuminates one of said first and second image display devices with said illuminating light;
   a viewing optical system that leads said image to an eyeball of an observer and;
   an optical coupling element having a light-coupling action provided between said first and second image display devices on the one hand and the eyeball of said observer on the other to superimpose images of said first and second image display devices on one another,
   wherein said image display device displays an image by transmission or reflection of said illuminating light,
   wherein said optical coupling element has an optical coupling surface tilted at an angle of approximately 45 degrees with respect to each of said two image display devices,
   wherein said viewing optical system projects said images superimposed on one another into the eyeball of said observer as an enlarged virtual image,
   wherein at least one surface of said viewing, optical system is an aspherical surface decentered with respect to an optical axis,
   wherein said first and second image display devices are disposed so that a pixel array of the first image display device and a pixel array of the second image display device are superimposed with a displacement therebetween, and
   an optical low-pass filter is placed in an optical path of said viewing optical system to separate light emanating from said first and second image display devices into a plurality of light beams in a direction approximately perpendicular to a direction of the displacement between said pixel arrays, thereby forming a smooth image.

7. An image display apparatus according to claim 6, wherein the following conditions are satisfied:

$$0 < Lx < 1.0 Px \quad (1)$$

$$0 < Ly < 1.0 Py \quad (2)$$

where Px is a horizontal pixel pitch between each pair of adjacent pixels of the same color on said first and second image display devices; Py is a vertical pixel pitch between each pair of adjacent pixels of the same color on said first and second image display devices; Lx is an amount of displacement of pixels in a horizontal direction; and Ly is an amount of displacement of pixels in a vertical direction.

8. An image display apparatus according to claim 6, wherein the following conditions are satisfied:

Lx=0.[7]5Px

Ly=0.5Py where Px is a horizontal pixel pitch between each pair of adjacent pixels of the same color on said first and second image display devices; Py is a vertical pixel pitch between each pair of adjacent pixels of the same color on said first and second image display devices; Lx is an amount of displacement of pixels in a horizontal direction; and Ly is an amount of displacement of pixels in a vertical direction.

9. An image display apparatus comprising:
 a light source that emits illuminating light;
 two image display devices;
 an illuminating optical system that illuminates one of said two image display devices with said illuminating light;
 a viewing optical system that leads said image to an eyeball of an observer; and
 an optical coupling element having a light-coupling action provided between said two image display devices on the one hand and the eyeball of said observer on the other to superimpose images of said two image display devices on one another,
 wherein said image display device displays an image by transmission or reflection of said illuminating light,
 wherein said optical coupling element has an optical coupling surface tilted at an angle of approximately 45 degrees with respect to each of said two image display devices,
 wherein said viewing optical system projects said images superimposed on one another into the eyeball of said observer as an enlarged virtual image, and
 wherein one of said two image display devices displays monochromatic image information carried by a luminance signal in an externally input picture signal, and the other of said two image display devices displays image information carried by a chrominance signal in said picture signal.

10. An image display apparatus according to claim 1, 5, 6 or 9, wherein said viewing optical system has a right viewing optical system for leading light to a right eye of said observer and a left viewing optical system for leading light to a left eye of said observer.

11. An image display apparatus according to claim 10, wherein said optical coupling element has an action by which coupled light is separated into light for said left viewing optical system and light for said right viewing optical system.

12. An image display apparatus according to claim 6 or 9, wherein at least one surface of said viewing optical system is an aspherical surface decentered with respect to an optical axis.

13. An image display apparatus comprising:
 a light source that emits illuminating light,
 two image display devices;
 an illuminating optical system that illuminates one of said two image display devices with said illuminating light;
 a viewing optical system that leads said image to an eyeball of an observer; and
 an optical coupling element having a light-coupling action provided between said two image display devices on the one hand and the eyeball of said observer on the other to superimpose images of said two image display devices on one another,
 wherein said image display device displays an image by transmission or reflection of said illuminating light;
 wherein said optical coupling element has an optical coupling surface tilted at an angle of approximately 45 degrees with respect to each of said two image display devices;
 wherein said viewing optical system projects said images superimposed on one another into one eyeball of said observer as an enlarged virtual image; and
 wherein said optical coupling element has a rectangular prism configuration in which said optical coupling surface is placed in a medium having a refractive index larger than 1, said optical coupling element having two surfaces on a side thereof closer to said two image display devices, said two surfaces being transmitting surfaces having positive powers approximately equal to each other, and said optical coupling element having an exit surface on a side thereof closer to said observer, said exit surface being a transmitting surface having a positive power, and said optical coupling element and said viewing optical system being formed from a single optical element.

14. An image display apparatus comprising:
 a light source that emits illuminating light,
 two image display devices;
 an illuminating optical system that illuminates one of said two image display devices with said illuminating light;
 a viewing optical system that leads said image to an eyeball of an observer; and
 an optical coupling element having a light-coupling action provided between said two image display devices on the one hand and the eyeball of said observer on the other to superimpose images of said two image display devices on one another, wherein said image display device displays an image by transmission or reflection of said illuminating light,
 wherein said optical coupling element has an optical coupling surface tilted at an angle of approximately 45 degrees with respect to each of said two image display devices;
 wherein said viewing optical system projects said images superimposed on one another into one eyeball of said observer as an enlarged virtual image; and
 wherein said two image display devices are reflective image display devices, said optical coupling element has a rectangular prism configuration in which said optical coupling surface is placed in a medium having a refractive index larger than 1, said light source is provided outside one side of said optical coupling element, and said illuminating optical system and said optical coupling element are formed from a single optical element.

15. An image display apparatus comprising:
 a light source that emits illuminating light;
 two image display devices;
 an illuminating optical system that illuminates one of said two image display devices with said illuminating light;
 a viewing optical system that leads said image to an eyeball of an observer; and an optical coupling element having a light-coupling action provided between said two image display devices on the one hand and the eyeball of said observer on the other to superimpose images of said two image display devices on one another, wherein said image display device displays an image by transmission or reflection of said illuminating light, wherein said optical coupling element has an optical coupling surface tilted at an angle of approximately 45 degrees with respect to each of said two image display devices; wherein said viewing optical system projects said images superimposed on one another into one eyeball of said observer as an enlarged virtual image, and wherein one of said two image display devices performs a display of higher resolution than the other.

16. An image display apparatus comprising:

a light source that emits illuminating light;

two image display devices;

an illuminating optical system that illuminates one of said two image display devices with said illuminating light;

a viewing optical system that leads said image to an eyeball of an observer; and an optical coupling element having a light-coupling action provided between said two image display devices on the one hand and the eyeball of said observer on the other to superimpose images of said two image display devices on one another, and direct said images superimposed on one another in two directions, wherein said image display device displays an image by transmission or reflection of said illuminating light, wherein said optical coupling element has an optical coupling surface tilted at an angle of approximately 45 degrees with respect to each of said two image display devices, wherein said viewing optical system includes two viewing optical systems to project said images superimposed on one another into the left and right eyes of said observer as enlarged virtual images, and wherein one of said two viewing optical systems has a wider field angle than the other.

17. An image display apparatus comprising:

a light source that emits illuminating light;

two image display devices;

an illuminating optical system that illuminates one of said two image display devices with said illuminating light;

a viewing optical system that leads said image to an eyeball of an observer;

an optical coupling element having a light-coupling action provided between said two image display devices on the one hand and the eyeball of said observer on the other to superimpose images of said two image display devices on one another, wherein said image display device displays an image by transmission or reflection of said illuminating light, wherein said optical coupling element has an optical coupling surface tilted at an angle of approximately 45 degrees with respect to each of said two image display devices, wherein said viewing optical system projects said images superimposed on one another into one eyeball of said observer as an enlarged virtual image, and wherein said viewing optical system includes a relay optical system and an ocular optical system, said relay optical system forming a real image of said images superimposed on one another as an intermediate image, and said ocular optical system projecting said intermediate image into the eyeball of said observer as an enlarged virtual image.

18. An image display apparatus according to claim 17, wherein said relay optical system is coaxial with respect to an optical axis.

19. An image display apparatus according to claim 17, wherein said relay optical system is asymmetric with respect to an optical axis.

20. An image display apparatus according to claim 18 or 19, wherein said relay optical system includes a transmitting surface of said optical coupling element and is formed from at least two optical elements.

21. An image display apparatus comprising:

a light source that emits illuminating light;

two image display devices;

an illuminating optical system that illuminates one of said two image display devices with said illuminating light;

a viewing optical system that leads said image to an eyeball of an observer; and an optical coupling element having a light-coupling action provided between said two image display devices on the one hand and the eyeball of said observer on the other to superimpose images of said two image display devices on one another, wherein said image display device displays an image by transmission or reflection of said illuminating light, wherein said optical coupling element has an optical coupling surface tilted at an angle of approximately 45 degrees with respect to each of said two image display devices; wherein said viewing optical system projects said images superimposed on one another into one eyeball of said observer as an enlarged virtual image, and wherein at least one surface of said illuminating optical system is an aspherical surface decentered with respect to an optical axis.

22. An image display apparatus according to claim 21, wherein at least one surface of said illuminating optical system is a Fresnel lens surface decentered with respect to an optical axis.

23. An image display apparatus comprising:

a light source that emits illuminating light;

two image display devices;

an illuminating optical system that illuminates one of said two image display devices with said illuminating light;

a viewing optical system that leads said image to an eyeball of an observer; and an optical coupling element having a light-coupling action provided between said two image display devices on the one hand and the eyeball of said observer on the other to superimpose images of said two image display devices on one another, wherein said image display device displays an image by transmission or reflection of said illuminating light, wherein said optical coupling element has an optical coupling surface tilted at an angle of approximately 45 degrees with respect to each of said two image display devices; wherein said viewing optical system projects said images superimposed on one another into one eyeball of said observer as an enlarged virtual image, and wherein at least one surface of said illuminating optical system is a rotationally asymmetric aspherical surface decentered with respect to an optical axis.

24. An image display apparatus comprising:

a light source that emits illuminating light;

two image display devices;

an illuminating optical system that illuminates one of said two an image display devices with said illuminating light;

a viewing optical system that leads said image to an eyeball of an observer; and an optical coupling element having a light-coupling action provided between said two image display devices on the one hand and the eyeball of said observer on the other to superimpose images of said two image display devices on one another, wherein said image display device displays an image by transmission or reflection of said illuminating light, wherein said optical coupling element has an optical coupling surface tilted at an angle of approximately 45 degrees with respect to each of said two image display devices; wherein said viewing optical system projects said images superimposed on one another into one eyeball of said observer as an enlarged virtual image, and wherein said illuminating optical system is a decentered prism member in which a space formed between at least two surfaces decentered with respect to each other is filled with a medium having a refractive index larger than 1.

25. An image display apparatus comprising:

a light source that emits illuminating light;

two image display devices;

an illuminating optical system that illuminates one of said two image display devices with said illuminating light;

a viewing optical system that leads said image to an eyeball of an observer; and an optical coupling element having a light-coupling action provided between said two image display devices on the one hand and the eyeball of said observer on the other to superimpose images of said two image display devices on one another, wherein said image display device displays an image by transmission or reflection of said illuminating light, wherein said optical coupling element has an optical coupling surface tilted at an angle of approximately 45 degrees with respect to each of said two image display devices, wherein said viewing optical system projects said images superimposed on one another into one eyeball of said observer as an enlarged virtual image, and wherein said optical coupling surface is a non-polarizing half-mirror surface.

26. An image display apparatus comprising:

a light source that emits illuminating light;

two image display devices;

an illuminating optical system that illuminates one of said two image display devices with said illuminating light;

a viewing optical system that leads said image to an eyeball of an observer; and an optical coupling element having a light-coupling action provided between said two image display devices on the one hand and the eyeball of said observer on the other to superimpose images of said two image display devices on one another, wherein said image display device displays an image by transmission or reflection of said illuminating light, wherein said optical coupling element has an optical coupling surface tilted at an angle of approximately 45 degrees with respect to each of said two image display devices, wherein said viewing optical system projects said images superimposed on one another into one eyeball of said observer as an enlarged virtual image, and wherein said optical coupling element has a rectangular prism configuration in which said optical coupling surface is placed in a medium having a refractive index larger than 1.

27. An image display apparatus according to claim 26, wherein one of entrance and exit surfaces of said optical coupling element has a positive power.

28. An image display apparatus according to claim 26, wherein at least one of transmitting surfaces of said optical coupling element is a Fresnel lens surface.

29. An image display apparatus comprising:

a light source that emits illuminating light;

two image display devices;

an illuminating optical system that illuminates one of said two image display devices with said illuminating light;

a viewing optical system that leads said image to an eyeball of an observer; and an optical coupling element having a light-coupling action provided between said two image display devices on the one hand and the eyeball of said observer on the other to superimpose images of said two image display devices on one another, wherein said image display device displays an image by transmission or reflection of said illuminating light, wherein said optical coupling element has an optical coupling surface tilted at an angle of approximately 45 degrees with respect to each of said two image display devices, wherein said viewing optical system projects said images superimposed on one another into one eyeball of said observer as an enlarged virtual image, wherein said illuminating optical system has a first illuminating optical system that illuminates one of said two image display devices with illuminating light and a second illuminating optical system that illuminates the other of said two image display devices with illuminating light, wherein said first illuminating optical system and said second illuminating optical system are disposed so that a distance between said light source and said first illuminating optical system, and a distance between said light source and said second illuminating optical system are approximately equal to each other.

* * * * *